(12) United States Patent
Fujita

(10) Patent No.: US 11,458,846 B2
(45) Date of Patent: Oct. 4, 2022

(54) BRAKE CONTROL APPARATUS FOR VEHICLE

(71) Applicant: Toyota Jidosha Kabushiki Kaisha, Toyota (JP)

(72) Inventor: Yoshitaka Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 339 days.

(21) Appl. No.: 16/868,051

(22) Filed: May 6, 2020

(65) Prior Publication Data

US 2020/0353819 A1 Nov. 12, 2020

(30) Foreign Application Priority Data

May 8, 2019 (JP) .............................. JP2019-088089

(51) Int. Cl.
*B60L 9/00* (2019.01)
*B60L 7/26* (2006.01)
(Continued)

(52) U.S. Cl.
CPC ................ *B60L 7/26* (2013.01); *B60T 7/042* (2013.01); *B60T 8/1701* (2013.01); *B60T 8/171* (2013.01); *B60T 8/3205* (2013.01); *B60T 2220/04* (2013.01); *B60T 2240/00* (2013.01); *B60T 2270/604* (2013.01); *B60T 2270/82* (2013.01)

(58) Field of Classification Search
CPC .. B60L 7/26; B60L 3/102; B60L 3/108; B60L 2240/16; B60L 2240/461; B60L 2240/465; B60L 7/16; B60L 9/00; B60T 7/042; B60T 8/1701; B60T 8/171; B60T 8/3205; B60T 2220/04; B60T 2240/00; B60T 2270/604; B60T 2270/82; B60T 1/10; B60T 13/58; B60T 2270/608; B60T 8/1766; B60T 8/176; B60T 8/58; (Continued)

(56) References Cited

U.S. PATENT DOCUMENTS

2007/0046099 A1\* 3/2007 Matsuura ............... B60K 6/365
303/152
2015/0217741 A1\* 8/2015 Kikawa ................. B60T 13/146
701/71
(Continued)

FOREIGN PATENT DOCUMENTS

JP 2017-060343 A 3/2017

*Primary Examiner* — Shardul D Patel
(74) *Attorney, Agent, or Firm* — Dinsmore & Shohl LLP

(57) ABSTRACT

A brake force control apparatus allocates all of required brake force to a target front wheel friction brake force when the required brake force is equal to or smaller than a maximum regeneration brake force. The apparatus decreases the target regeneration brake force by a first predetermined amount at a first time point at which a front wheel acceleration varies from a value larger than a first acceleration threshold to a value equal to or smaller than the first acceleration threshold. The apparatus increases the target regeneration brake force in such a manner that the target regeneration brake force coincides with the required brake force, if the front wheel acceleration becomes larger than a second acceleration threshold in a period from the first time point to a second time point at which a predetermined time elapses from the first time point.

6 Claims, 14 Drawing Sheets

(51) Int. Cl.
*B60T 8/32* (2006.01)
*B60T 7/04* (2006.01)
*B60T 8/171* (2006.01)
*B60T 8/17* (2006.01)

(58) Field of Classification Search
CPC ............ F16D 61/00; B60W 30/18109; B60W 30/18127; B60W 40/068; B60W 40/105
USPC .......................................................... 701/22
See application file for complete search history.

(56) References Cited

U.S. PATENT DOCUMENTS

2016/0264002 A1* 9/2016 Suda .................... B60T 8/17616
2018/0264949 A1* 9/2018 Kaneko ............... B60L 15/2009

* cited by examiner

BRAKE CONTROL APPARATUS FOR VEHICLE

CROSS REFERENCE TO RELATED APPLICATIONS

This nonprovisional application claims priority to Japanese Patent Application No. 2019-088089 filed with the Japan Patent Office on May 8, 2019, the entire contents of which are hereby incorporated by reference.

TECHNICAL FIELD

The present disclosure relates to a brake control apparatus for a vehicle having a regeneration brake device configured to apply a regeneration brake force to wheels and a friction brake device configured to apply a friction brake force to the wheels.

BACKGROUND

A conventional brake control apparatus for a vehicle, having a regeneration brake device configured to apply a regeneration brake force to wheels and a friction brake device configured to apply a friction brake force to the wheels, is typically configured to apply the regeneration brake force to the wheels as much as possible in order to recover electric power as much as possible.

Such a conventional brake control apparatus may replace a part of the regeneration brake force with a part of the friction brake force, as necessary.

More specifically, one of the conventional brake control apparatuses (hereinafter, referred to as a "conventional apparatus") is configured to replace a part of the regeneration brake force with a part of the friction brake force, when an antiskid brake control (hereinafter, referred to as an "ABS control") is being performed, for instance. Generally, a responsiveness of the friction brake force controlled by an oil pressure is slower than a responsiveness of the regeneration brake force. From this view point, the conventional apparatus is configured to set a decreasing rate of the regeneration brake force in such a manner that an increase rate of the friction brake force can catch up the decreasing rate of the regeneration brake force in order to perform the ABS control (refer to Japanese Patent Application Laid-Open (kokai) No. 2017-60343 see. FIG. 4).

SUMMARY

Meanwhile, the conventional apparatus starts replacing a part of the regeneration brake force with a part of the friction brake force when a start flag of ABS control is set. The conventional apparatus starts performing the ABS control operation (i.e., decreasing and increasing the brake oil pressure) after the replacement of the regeneration brake force with the friction brake force is completed. Therefore, a total brake force during the replacement remains the same as the total brake force generated before the start flag of ABS control is set. This causes the wheel to take a relatively long time to recover from a wheel locking. In view of this, an apparatus of this type may be configured to determine that the wheel tends to lock at an earlier timing so as to set the start flag of ABS control at an earlier timing. However, the thus configured apparatus may start replacing a part of the regeneration brake force with a part of the friction brake force even when the ABS control is actually not necessary. This reduces chances to use generation brake force, and thus, the energy efficiency may be degraded.

The present disclosure is made to cope with the above problems. One of the objects of the present disclosure is to provide a brake control apparatus that can reduce an unnecessary replacement of the regeneration brake force with the friction brake force so as to be capable of increasing chances to use the regeneration brake force and improves the energy (fuel) efficiency.

A brake control apparatus (hereinafter, simply referred to as a "present disclosed apparatus") according to the present disclosure is applied to a vehicle (10). The vehicle (10) has a regeneration brake device (20, 40) configured to apply a regeneration brake force (Frgn) to front wheels (WF), and a friction brake device (30) configured to apply a front wheel friction brake force (Ffrcf) to the front wheels (WF) and apply a rear wheel friction brake force (Ffrcr) to rear wheels (WR).

The present disclosed apparatus comprises:
wheel speed sensors (53FL, 53FR), each configured to obtain a signal indicative of a wheel speed of each of the front wheels (WF);
a brake pedal operation amount sensor (52) configured to obtain a signal indicative of an operation amount of a brake pedal (52a); and
an electronic control unit (40, 50) configured to:
acquire a front wheel acceleration (DVwf) of the front wheels based on the signal obtained by the wheel speed sensors (step 1020);
acquire a required brake force (Freq) based on the signal obtained by the brake pedal operation amount sensor (step 1030);
allocate/distribute the required brake force (Freq) to a target regeneration brake force (Frgnt), a target front wheel friction brake force (Ffrcft), and a target rear wheel friction brake force (Ffrcrt); and
make/let the "regeneration brake device" apply the "regeneration brake force that is equal to the target regeneration brake force" to the "front wheels", make/let the "friction brake device" apply the "front wheel friction brake force that is equal to the target front wheel friction brake force" to the "front wheels", and make/let the "friction brake device" apply the "rear wheel friction brake force that is equal to the target rear wheel friction brake force" to the "rear wheels".

In a case where the required brake force (Freq) is equal to or smaller than a maximum regeneration brake force (Frgnmax) which (is the greatest regeneration brake force) the regeneration brake device can apply to the front wheels,
the electronic control unit is configured to:
allocate/distribute all of the required brake force to the target regeneration brake force (step 1050);
perform brake force decreasing control to decrease the target regeneration brake force (Frgnt) by a first predetermined amount (δ·Freq) without varying the target front wheel friction brake force (Ffrcft) and the target rear wheel friction brake force (Ffrcrt) (or keeping the Ffrcft and Ffrcrt at zero) (step 1070), at a first time point (t11) at which the front wheel acceleration (DVwf) varies from a value larger than a first acceleration threshold (DVth11) that is a negative value to a value equal to or smaller than the first acceleration threshold while all of the required brake force is being allocated to the target regeneration brake force (steps 810-830, step 1040: No, step 1060: Yes).

In some embodiments, the electronic control unit is configured, while performing the brake force decreasing control, to:

perform brake force recovery control (step 1050) to increase the target regeneration brake force in such a manner that the target regeneration brake force coincides with (or returns to, becomes equal to) the required brake force, if the front wheel acceleration becomes larger than a second acceleration threshold (DVth12) that is equal to or larger than the first acceleration threshold (DVth11) in a period from the first time point (t11) to a second time point (t13) at which a predetermined time (tw11) elapses from the first time point (step 920: Yes, step 1040: Yes); and perform brake force replacing control (step 1080) to, if the front wheel acceleration does not become larger than the second acceleration threshold in the period from the first time point to the second time point (step 920: No, step 940: Yes, step 1060: No);

decrease the target regeneration brake force by a second predetermined amount (β) every time a predetermined time (Δt) elapses; and increase the target front wheel friction brake force and the target rear wheel friction brake force in such a manner that a sum (Ffrcft+Ffrcrt) of the target front wheel friction brake force and the target rear wheel friction brake force is increased by the second predetermined amount every time the predetermined time (Δt) elapses, while maintaining a proportional relationship (Ffrcrt=α·Ffrcft) between the target front wheel friction brake force and the target rear wheel friction brake force.

In other words, in some embodiments, the present disclosed apparatus comprises: a front wheel acceleration obtaining section (50, 52, 53), a required brake force obtaining section (50), a distributed brake force calculation section (50), and a brake force applying section (50).

The front wheel acceleration obtaining section is configured to obtain the acceleration of the front wheels (DVwf) based on the wheel speed (Vwf) of the front wheels (WF).

The required brake force obtaining section is configured to obtain the required brake force (Freq) based on the brake pedal operating amount (BP).

The distributed brake force calculation section is configured to distribute/allocate the required brake force (Freq) to the target regeneration brake force (Frgnt), the target front wheel friction brake force (Ffrcft), and the target rear wheel friction brake force (Ffrcrt).

The brake force applying section is configured to:

apply the regeneration brake force to the front wheels using the regeneration brake device in such a manner that the applied regeneration brake force coincides with (or becomes equal to) the target regeneration brake force;

apply the front wheel friction brake force to the front wheels using the friction brake device in such a manner that the applied front wheel friction brake force coincides with (or becomes equal to) the target front wheel friction brake force; and apply the rear wheel friction brake force to the rear wheels using the friction brake device in such a manner that the applied rear wheel friction brake force coincides with (or becomes equal to) the target rear wheel friction brake force.

In some embodiments, the distributed brake force calculation section is configured to work/operate as follows, when the required brake force (Freq) is equal to or smaller than the maximum regeneration brake force (Frgnmax).

(1) The distributed brake force calculation section allocates all of the required brake force to the target regeneration brake force (step 1050).

(2) The distributed brake force calculation section executes the brake force decreasing control (step 1070) to decrease the target regeneration brake force by the first predetermined amount (δ·Freq), when the front wheel acceleration (DVwf) varies/decreases from the value larger than the first acceleration threshold (DVth11) that is a negative value to the value equal to or smaller than the first acceleration threshold (step 820: Yes, step 1040: No, step 1060: Yes), while the distributed brake force calculation section is allocating all of the required brake force to the target regeneration brake force.

(3) The distributed brake force calculation section executes the brake force recovery control (step 1050) to increase the target regeneration brake force (Frgnt) in such a manner that the target regeneration brake force (Frgnt) coincides with the required brake force (Freq), if the front wheel acceleration (DVwf) becomes larger than the second acceleration threshold (DVth12) that is equal to or larger than the first acceleration threshold (DVth11) in the period from the first time point (t11) at which the target regeneration brake force (Frgnt) is decreased by the first amount (=δ·Freq) to the second time point (t13) at which the predetermined time (tw11) elapses from the time point (t11) (step 920: Yes, Step 1040:Yes).

(4) The distributed brake force calculation section executes, if the front wheel acceleration (DVwf) has/does not become larger than the second acceleration threshold (DVth12) in the period from the time point (t11) to the second time point (t13) (step 920: No, step 940: Yes, step 1040: No, step 1060: No), the brake force replacing control (step 1080) to:

decrease the target regeneration brake force (Frgnt) by the second predetermined amount (β) every time the predetermined time (Δt) elapses; and increase the target front wheel friction brake force (Ffrcft) and the target rear wheel friction brake force (Ffrcrt) in such a manner that the "sum (Ffrcft+Ffrcrt) of the target front wheel friction brake force (Ffrcft) and the target rear wheel friction brake force (Ffrcrt)" is increased by the second predetermined amount (β) every time the predetermined time (Δt) elapses while maintaining a proportional relationship (Ffrcrt=α·Ffrcft) between the target front wheel friction brake force (Ffrcft) and the target rear wheel friction brake force (Ffrcrt).

In the above manner, while all of the required brake force is realized (satisfied with) the regeneration brake force, the regeneration brake force being applied to the front wheels is firstly decreased at the first time point when the front wheel acceleration decreases below (becomes lower than) the first acceleration threshold (<0). By this reduction of the regeneration brake force, it is expected that the front wheel acceleration starts to increase. In view of this, whether or not the front wheel acceleration becomes larger than the second acceleration threshold (DVth12) in the period from the time point (t11) to the second time point (t13) is determined. If it is determined that the front wheel acceleration becomes larger than the second acceleration threshold in the period, it is considered that the front wheels have become unlikely to lock up since the front wheel acceleration has increased. Therefore, in this case, the regeneration brake force is returned to the required brake force. Generally, the responsiveness of the regeneration brake force is higher than the responsiveness of the friction brake force. Thus, the regeneration brake force can rapidly return to the previous force that is the force before the regeneration brake force was decreased at the first time point.

To the contrary, if the front wheel acceleration does not become larger than the second acceleration threshold in the period, it is considered that the front wheels are still likely to start locking up. Therefore, in this case, the target regeneration brake force (Frgnt) is decreased by the second predetermined amount ($\beta$) every time the predetermined time ($\Delta t$) elapses. In addition, the target front wheel friction brake force (Ffrcft) and the target rear wheel friction brake force (Ffrcrt) are increased so as to compensate for the decrease of the target regeneration brake force. In other words, the replacing brake force (replacing control) is carried out. In this occasion, the proportional relationship (Ffrcrt=$\alpha$·Ffrcft) between the target front wheel friction brake force (Ffrcft) and the target rear wheel friction brake force (Ffrcrt) is maintained.

In this manner, the regeneration brake force is decreased rapidly and temporarily when the front wheel acceleration has decreased greatly. Thus, the unnecessary replacement of the regeneration brake force with the friction brake force can be avoided. Consequently, the energy efficiency can be improved because the chances of using the regeneration brake force can be increased.

In some embodiments, the electronic control unit is configured to employ, as the first predetermined amount, an amount of 10 to 15 percent of the target regeneration brake force (allocated) at a time point immediately before the first time point. The target regeneration brake force at the time point immediately before the first time point may be simply referred to as "target regeneration brake before reduced".

If the first predetermined amount is about 1% of the target regeneration brake force before reduced, it is highly unlikely that the driver feels a feeling of strangeness when the target regeneration brake force is decreased by the first predetermined amount, however, the chances that the front wheel acceleration starts to increase after decreasing of the regeneration brake force are also reduced, and thus, the chances of the replacement of the regeneration brake force with the friction brake force are increased. To the contrary, if the first predetermined amount is about 20% of the target regeneration brake force before reduced, the chances that the replacement of the regeneration brake force with the friction brake force can be decreased, however, it is likely that the driver feels a feeling of strangeness when the target regeneration brake force is decreased by the first predetermined amount. In view of the above, the above embodiment of the electronic control unit is configured to reduce the target regeneration brake force by the amount of 10 to 15 percent of the target regeneration brake force (allocated) at a time point immediately before the first time point. Therefore, the above embodiment can prevent the driver from feeling a feeling of strangeness and reduce a possibility that the front wheels continue being in the the lock-up tendency.

In some embodiments, the electronic control unit is configured to perform first brake force distribution control including the brake force decreasing control, the brake force recovery control, and the brake force replacing control, wherein the second acceleration threshold (DVth12) is set at a value equal to the first acceleration threshold (i.e., DVth12=DVth11).

For instance, if the regeneration brake is carried out while the vehicle is running on a road (hereinafter, referred to as a "low $\mu$ road") having a road surface whose friction coefficient is low, the acceleration of the front wheels tends to decrease so as to become lower than the first acceleration threshold. At the first time point at which the acceleration of the front wheels becomes lower than the first acceleration threshold, the target regeneration brake force is reduced by the first predetermined amount. If the acceleration of the front wheels starts increasing instead of decreasing after the first time point, the front wheels are not likely to be in the lock-up tendency (the front wheels are not likely to be about to lock-up). Whereas, if the acceleration of the front wheels further decreases (or continues decreases) after the first time point, the front wheels are still likely to be in the lock-up tendency (the front wheels are still likely to be about to lock-up). In view of the above, in the above embodiment, the second acceleration threshold is set at a value equal to (or substantially equal to) the first acceleration threshold (i.e., DVth11=DVth12). Therefore, the above embodiment can determine certainly whether or not the front wheels are likely to be in the lock-up tendency (or the front wheels are about to lock-up), while the vehicle is running on the low $\mu$ road.

In some embodiments, the electronic control unit is configured to perform second brake force distribution control including the brake force decreasing control, the brake force recovery control, and the brake force replacing control, wherein the second acceleration threshold (DVth12) is set at a predetermined positive value (i.e., DVth12>0).

For instance, in a case where the regeneration brake is carried out while the vehicle is running on a road (hereinafter, referred to as a "high $\mu$ road") having a road surface whose friction coefficient is high, the acceleration of the front wheels rapidly decreases when the front wheels pass through (or move on) a part of the low $\mu$ road. In order to detect such a rapid decreasing of the acceleration of the front wheels, the first acceleration threshold is set at a value (negative value) lower than an acceleration of the front wheels that is observed when the regeneration brake is carried out while the vehicle is running on the high $\mu$ road. According to the above embodiment, the target regeneration brake force is decreased by the first amount when the acceleration of the front wheels becomes lower than the first acceleration threshold in the above case where the front wheels pass through (or move on) the part of the low $\mu$ road. Therefore, the acceleration of the front wheels starts increasing instead of decreasing.

The increase of the acceleration of the front wheels depends on a road surface condition after acceleration of the front wheels starts increasing instead of decreasing. For instance, when the front wheels pass through a low $\mu$ section/part that has a short distance/length such as a bump and a manhole in a case where the vehicle is running on the high $\mu$ road and is being braked with the regeneration brake force, the acceleration of the front wheels starts rapidly increasing after the front wheel pass through the low $\mu$ section, since the front wheels are on the high $\mu$ road immediately after the front wheels pass through the low $\mu$ section. In this case, the acceleration of the front wheels increases to become a positive value (i.e., the front wheels starts accelerating).

In contrast, when the low $\mu$ section is long, the acceleration of the front wheels cannot become large after the acceleration of the front wheels starts increasing, as compared to a case where the low $\mu$ section is short. In the above embodiment, the second acceleration threshold (DVth12) is set at the positive value, and it is determined that the front wheels are unlikely to be in the lock-up tendency when the acceleration of the front wheels becomes larger than the second acceleration threshold, whereas, it is determined that the front wheels are still likely to be in the lock-up tendency when the acceleration of the front wheels does not become larger than the second acceleration threshold.

In some embodiments, the electronic control unit is configured to perform a first brake force distribution control (step 1470) including the brake force decreasing control, the brake force recovery control, and the brake force replacing control, wherein the second acceleration threshold is set at a value equal to the first acceleration threshold, when a product (|Dvwf|·M) of a magnitude (|Dvwf↑|) of the front wheel acceleration and a weight (M) of the vehicle is equal to or larger than a value obtained by adding a third predetermined value ((γ−1)·Frgnt) to the target regeneration brake force (step 1440: Yes), and a slip ratio (SL(n−1)) of the front wheels is equal to or larger than a predetermined slip ratio threshold (SLth) (step 1460: Yes).

In the above embodiment, the electronic control unit is further configured to perform second brake force distribution control (step 1480) including the brake force decreasing control, the brake force recovery control, and the brake force replacing control, wherein the first acceleration threshold of the second brake force distribution control is set at a value equal to or smaller than the first acceleration threshold used in the first brake force distribution control, and the second acceleration threshold of the second brake force distribution control is set at a predetermined positive value, when the product of the magnitude of the front wheel acceleration and the weight is equal to or larger than the value obtained by adding the third predetermined value to the target regeneration brake force (step 1440: Yes), and the slip ratio of the front wheels is smaller than the predetermined slip ratio threshold (step 1460: No).

Furthermore, in the above embodiment, the electronic control unit is configured to perform regeneration brake force maintaining control to maintain a state where all of the required brake force is allocated to the target regeneration brake force, when the product of the magnitude of the front wheel acceleration and the weight is smaller than the value obtained by adding the third predetermined value to the target regeneration brake force (step 1440: No).

According to the above embodiment, it is possible to distinguish between a low μ case and a high μ case. The low μ case is a case where the regeneration brake is being carried out on the low μ road, and the high μ case is a case where the regeneration brake is being carried out on the high μ road and the front wheels temporarily move on the low μ section. In addition, the second acceleration threshold is set at the value substantially equal to the first acceleration threshold in the low μ case, and the second acceleration threshold is set at the positive predetermined value in the high μ case. Therefore, the brake force distribution controls including the first brake force distribution control and the second brake force distribution control are appropriately performed in accordance with the road surface condition.

Notably, in the above description, in order to facilitate understanding of the present disclosure, the constituent elements or parameters of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION

First Embodiment (Configuration)

Figure 1:
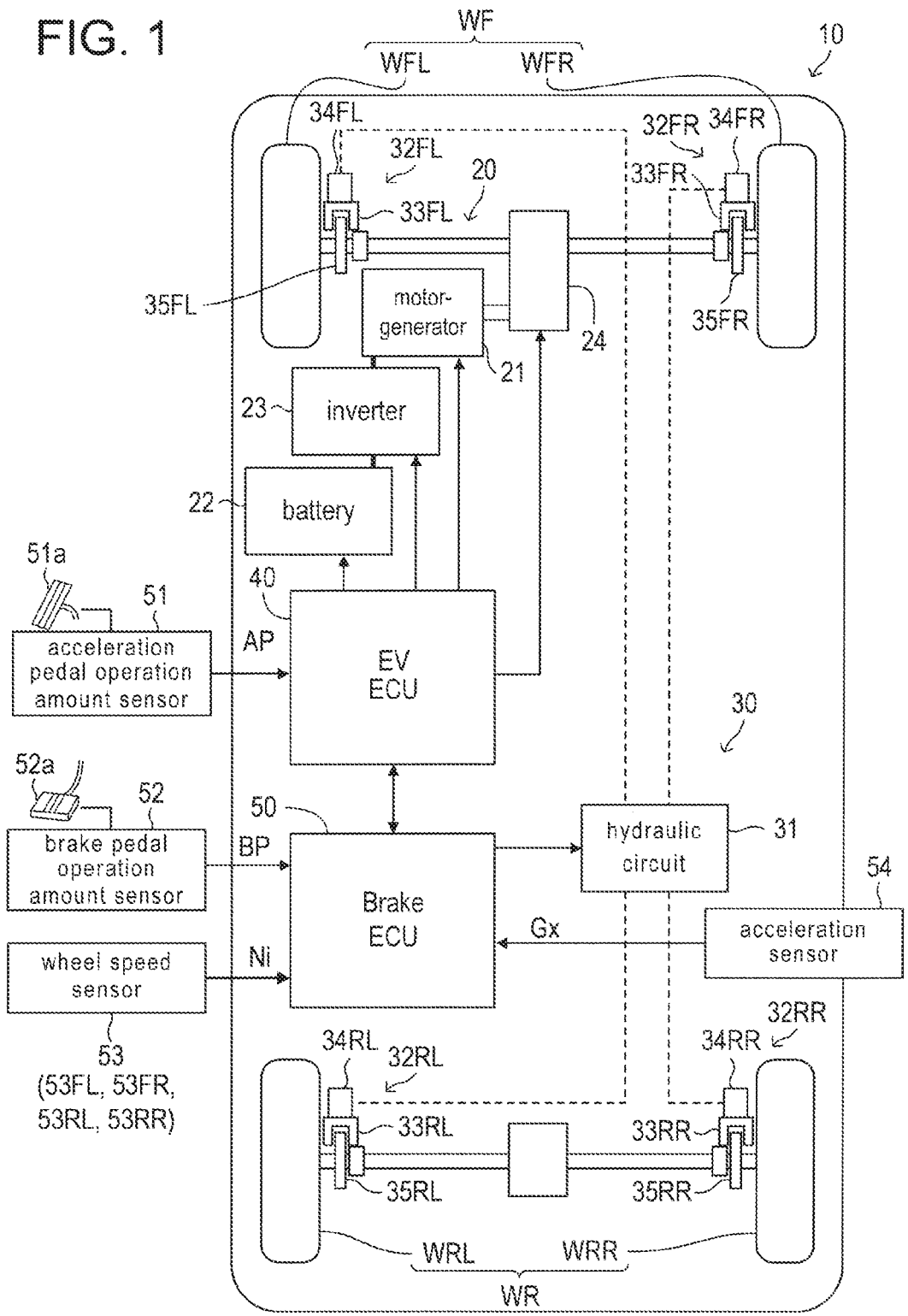
FIG. 1 is a schematic diagram of a brake control apparatus of a vehicle according to an embodiment of the present disclosure.

A brake control apparatus (hereinafter, referred to as a "first apparatus") of a vehicle according to a first embodiment of the present disclosure is applied to a vehicle 10 as shown in FIG. 1. The vehicle 10 is equipped with a regeneration brake device 20, a friction brake device 30, an EV-ECU 40, a brake ECU 50, or the like.

ECU is an abbreviation of Electronic Control Unit. The ECU is an electronic control circuit (controller) that includes, as a main component, a microcomputer having a CPU, a ROM, a RAM, a back-up RAM (or a nonvolatile memory) and an interface I/F. The CPU achieves various functions described later through executing instructions (routines) stored in the memory (ROM). The EV-ECU 40 and the brake ECU 50 may be integrated into a single ECU.

The regeneration brake device 20 includes a motor-generator 21, a battery 22, an inverter 23, and a transmission 24. The motor-generator 21 includes an AC synchronous motor. An output shaft of the motor-generator 21 is connected to a front left wheel WFL and a front right wheel WFR via the transmission 24. Hereinafter, the front left wheel WFL and the front right wheel WFR may sometimes be referred to as "front wheels WF" collectively. In addition, the rear left wheel WRL and the rear right wheel WRR may sometimes be referred to as "rear wheels WF" collectively. A power (torque) is capable of being transmitted between the output shaft of the motor-generator 21 and the front wheels WF. The battery 22 is a secondary battery that is chargeable and dischargeable. The battery 22 is a lithium battery, but may be a Nickel-metal hydride battery, a lead-acid batter, or a Nickel-Cadmium rechargeable battery, as long as the battery 22 is chargeable and dischargeable. The regeneration brake device 20 functions not only as a brake device but also as a drive device to drive the front wheels WF when an acceleration pedal 51a is depressed.

The inverter 23 is electrically connected with the battery. When the motor-generator 21 functions as a generator, the motor-generator 21 converts rotational energy (rotational kinetic energy) of the front wheels WF into electric energy (AC electric power). The inverter 23 converts the AC electric power supplied from the motor-generator 21 into DC electric power. The inverter 23 supplies the DC electric power to the battery 22 so as to charge the battery 21 with the DC electric power. At this time (when the battery 21 is being charged with the converted DC electric power), a regeneration brake force Frgn is applied to the front wheels WF. On the other hand, the inverter 23 convers the DC electric power supplied from the battery 22 into an AC electric power and supplies the AC electric power to the motor-generator 21 to let the motor-generator 21 function as a motor. Thereby, the motor-generator 21 applies the driving torque to the front wheels WF.

In this manner, the motor-generator 21 is an actuator configured to apply the regeneration brake force to the front wheels WF as well as an actuator configured to apply the driving force to the front wheels WF. It should be noted that the brake/braking by the regeneration brake device 20 is referred to as a "regeneration brake/braking".

The friction brake device 30 includes a hydraulic circuit 31 and friction based braking-mechanisms 32FL, 32FR, 32RL, and 32RR. It should be noted that, in the present specification, for elements provided for respective wheels or for parameters used for respective wheels, one of a suffix FL or fl for representing the front left wheel WFL, a suffix FR or fr for representing the front right wheel WFR, a suffix RL or rl for representing the rear left wheel WRL, and a suffix RR or rr for representing the rear right wheel WRR is attached to the end of the reference numeral of the element or the parameter. The suffix is omitted when the position of the wheel does not need to be specified for each of the elements/parameters provided/used for the respective wheels.

The hydraulic circuit 31 is provided between an unillustrated master cylinder configured to compress operating fluid (brake oil) with a depression force of the brake pedal 52a and the friction based brake mechanisms 32, each provided at the front left wheel WFL, the front right wheel WFR, the rear left wheel WRL, and the rear right wheel WRR. The hydraulic circuit 31 includes an unillustrated reservoir, an unillustrated oil pump, and unillustrated various valves, and is configured to function as a friction brake actuator. The hydraulic circuit 31 applies a hydraulic pressure (braking oil pressure) of the operating fluid to a wheel cylinder 34 which is built in the brake caliper 33 of each of the friction based brake mechanisms 32. The wheel cylinder 34 works due to the hydraulic pressure to thereby press an unillustrated brake pad onto the brake disc 35. Thereby, a friction brake force Ffrc is generated. It should be noted that the brake/braking by the friction brake device 30 is referred to as a "friction brake/braking". The friction brake force Ffrc is composed of a front wheel friction brake force Ffrcf and a rear wheel friction brake force Ffrcr. The front wheel friction brake force Ffrcf is a friction brake force applied to the front wheels WF through the friction based brake mechanisms 32 provided at the front wheels WF. The rear wheel friction brake force Ffrcr is a friction brake force applied to the rear wheels WR through the friction based brake mechanisms 32 provided at the rear wheels WR.

The EV-ECU 40 is connected with the brake ECU 50 via a CAN (Controller Area Network) so as to mutually exchange information with each other. The EV-ECU 40 is electrically connected with various sensors including an acceleration pedal operation amount sensor 51. The EV-ECU 40 is configured to receive output signals sent from the sensors. The acceleration pedal operation amount sensor 51 is configured to generate an output signal indicative of an operation amount AP (hereinafter, referred to as an "acceleration opening degree AP") of the acceleration pedal 51a. The EV-ECU 40 is electrically connected with the regeneration brake device 20. The EV-ECU 40 is configured to transmit various signals to the regeneration brake device 20 to control the regeneration brake device 20, based on the acceleration pedal opening degree AP, a signal indicative of an operation of an unillustrated shift lever, or the like.

The brake ECU 50 is electrically connected to a brake pedal operation amount sensor 52, wheel speed sensors 53 (53FL, 53FR, 53RL, and 53RR), and an acceleration sensor 54. The brake ECU 50 is configured to receive the output signals sent from the connected sensors. The brake pedal operation amount sensor 52 is configured to generate an output signal indicative of an operating amount (hereinafter, referred to as a "brake pedal operating amount BP") of the brake pedal 52a.

The brake ECU 50 calculates a required brake torque Tr* based on the brake pedal operating amount BP and a vehicle speed SPD (speed of the vehicle 10). The brake ECU 50 calculates a product of the required brake torque Tr* and a predetermined dynamic rolling radius r of the front wheel(s) as a required brake force Freq. The brake ECU 50 calculates, as the wheel speed SPD, an average of the wheel speeds (Vwfl, Vwfr, Vwrl, and Vwrr).

More specifically, the brake ECU 50 acquires the required brake torque Tr* by applying the detected brake pedal operating amount BP and the calculated vehicle speed SPD to a look-up table MapTr*(BP, SPD) that defines a relationship between the required brake torque Tr* and a combination of the brake pedal operating amount BP and the vehicle speed SPD. According to the look-up table MapTr*(BP, SPD), an absolute value of the required brake torque Tr* is obtained in such a manner that the absolute value becomes larger as the brake pedal operating amount BP becomes larger, and in such a manner that the absolute value becomes larger as the vehicle speed SPD becomes higher. The look-up table MapTr*(BP, SPD) has been determined in advance based on experiments and/or simulations, and has been stored in the memory (ROM) of the brake ECU 50.

As described later in detail, the brake ECU 50 is configured to allocate (distribute/assign) the required brake force Freq to/into a target value Frgnt of the regeneration brake force Frgn, a target value Ffrcft of the front wheel friction brake force Ffrcf, and a target value Ffrcrt of the rear wheel friction brake force Ffrcr.

The target value Frgnt of the regeneration brake force may be referred to as a "target regeneration brake force Frgnt".

The target value Ffrcft of the front wheel friction brake force may be referred to as a "target front wheel friction brake force Ffrcft".

The target value Ffrcrt of the rear wheel friction brake force may be referred to as a "target rear wheel friction brake force Ffrcrt".

The brake ECU 50 is configured to apply the regeneration brake force Frgn that is equal to the target regeneration brake force Frgnt to the front wheels WF using the regeneration brake device 20.

The brake ECU 50 is configured to apply the front wheel friction brake force Ffrcf that is equal to the target front wheel friction brake force Ffrcft to the front wheels WF by controlling the braking oil pressure in the wheel cylinders 34FL, 34FR.

The brake ECU 50 is configured to apply the rear wheel friction brake force Ffrcr that is equal to the target rear wheel friction brake force Ffrcrt to the rear wheels WR by controlling the braking oil pressure in the wheel cylinders 34RL, 34RR.

Each of the wheel speed sensors 53 is configured to generate a pulse every time a corresponding wheel rotates by a predetermined angle. The brake ECU 50 counts the number of pulse generated by each of the wheel speed sensors 53 per unit time to obtain each of counted values. The brake ECU 50 calculates/acquires a speed (i.e., wheel speed) of each of the wheels at which the respective wheel speed sensors 53 are provided based on each of the respective counted values. More specifically, the brake ECU 50 calculates/acquires each of the wheel speeds (Vw) in accordance with an expression(equation) (1) described below.

$$Vw = r \cdot \omega = r \cdot (2 \cdot \pi/N) \cdot (Ni/\Delta T) \quad (1)$$

In Expression (1), "r" is a dynamic radius of each of the wheels, "ω" is an angular velocity of each of the wheels, "N" is the number of teeth of a rotor which rotates together with a shaft connected to each of the wheel (i.e., the "N" is the number of the pulses per one rotation of the rotor/wheel), and "Ni" is the counted values of the pulses per unit time $\Delta T$.

In this manner, the brake ECU 50 is configured to acquire:
the wheel speed Vwfl of the front left wheel WFL;
the wheel speed Vwfr of the front right wheel WFR;
the wheel speed Vwrl of the rear left wheel WRL; and
the wheel speed Vwrr of the rear right wheel WRR.

The acceleration sensor 54 is fixed to a vehicle body (sprung member) of the vehicle 10, and is configured to generate an output signal indicative of a vehicle acceleration Gx that is an acceleration in a longitudinal (front-rear) direction of the vehicle 10.

(Outline of Operation)

As described above, the first apparatus is applied to the vehicle 10 that has the regeneration brake device 20 configured to apply the regeneration brake force Frgn only to the front wheels WF, and has the friction brake device 30 configured to apply the friction brake force Ffrc to the wheels (i.e., to the front wheels WF as well as the rear wheels WR). In other words, the friction brake device 30 is configured to apply the front wheel friction brake force Ffrcf to the front wheels WF, and to apply the rear wheel friction brake force Ffrcr to the rear wheels WR.

When a driver of the vehicle 10 depresses the brake pedal 52a while the vehicle 10 is running/traveling, the first apparatus is configured to allocate (assign/distribute) the required brake force Freq determined based on the operation (amount) of the brake pedal 52a to/into the regeneration brake force Frgn more preferentially than the friction brake force Ffrc in order to recover the regenerated electric power as much as possible. In other words, a ratio of the regeneration brake force Frgn to the required brake force Freq is made larger than a ratio of the friction brake force Ffrc to the required brake force Freq. When the regeneration brake force Frgn applied to (allocated to) the front wheels WF becomes greater than the maximum regeneration brake force Frgnmax that is the greatest regeneration brake force Frgn that the regeneration brake device 20 can generate, the first apparatus is configured to apply the friction brake force Ffrc to the wheels including the front wheels WF and the rear wheels WR, in addition to the maximum regeneration brake force Frgnmax applied to the front wheels WF. It should be noted that the maximum regeneration brake force Frgnmax varies mainly depending on the capability for power conversion of the inverter 23.

Accordingly, when the required brake force Freq is equal to or smaller than the maximum regeneration brake force Frgnmax, the first apparatus firstly allocates/assigns all of the required brake force Freq to the target regeneration brake force Frgnt. In this stage, if the first apparatus determines that the front wheels WF are about/likely to lock up (or detects a lock-up tendency of the front wheels WF), the first apparatus decreases the target regeneration brake force Frgnt by an amount determined by a predetermined ratio δ. Thereafter, if the first apparatus determines that the front wheels WF are unlikely to lock up (or determines that the lock-up tendency of the front wheels WF has disappeared), the first apparatus increases the target regeneration brake force Frgnt to the required brake force Freq. In contrast, when the first apparatus determines that the front wheels WF remains in the lock-up tendency (or determines that the front wheels WF are still likely to lock up, or the lock-up tendency of the front wheels WF has not disappeared) after the first apparatus has decreased the target regeneration brake force Frgnt by the amount, the first apparatus gradually decreases the target regeneration brake force Frgnt at a predetermined rate, and increases a target value (target wheel friction brake force Ffrct) of the friction brake force at the predetermined rate.

Figure 2:
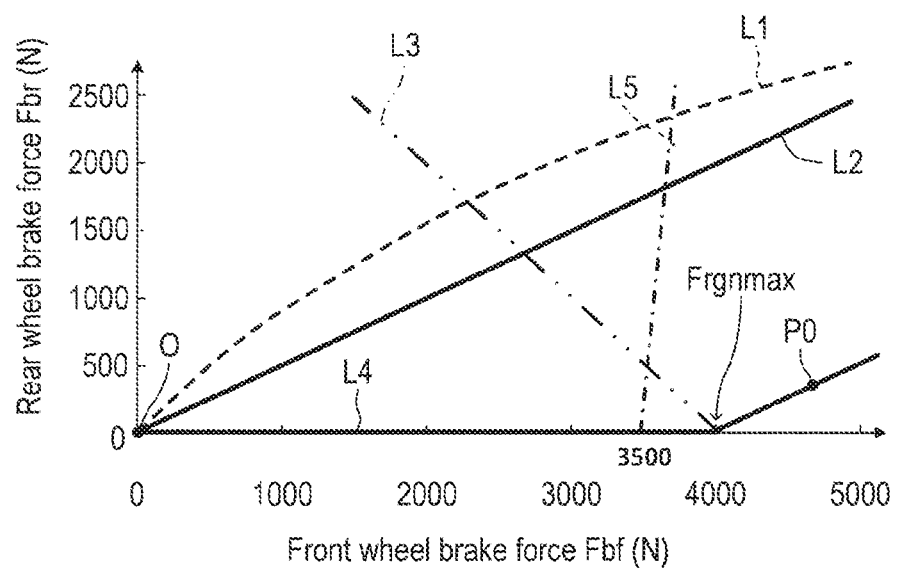
FIG. 2 is a graph showing relationships between a front wheel brake force and a rear wheel brake force.

Next, a method to distribute/allocate the brake force to the front wheel WF and the rear wheels WR will be described referring to FIG. 2 in a case where the vehicle 10 is running on a low μ road having a low friction coefficient and the driver depresses the brake pedal 52a to decelerate the vehicle 10. FIG. 2 shows a graph indicating a distribution ratio between the brake force applied to the front wheel WF and the brake force applied to the rear wheels WR. The brake force applied to the front wheel WF is referred to a "front wheel brake force", and the brake force applied to the rear wheels WR is referred to a "rear wheel brake force".

In FIG. 2, a curved line L1 is a line of an ideal brake force distribution (or an ideal brake force distribution line L1) that is based on a ground contact load/force of the front wheels WF and a ground contact load/force of the rear wheels WR. For instance, when a distribution ratio between the front wheel brake force Fbf and the rear wheel brake force Fbr is on the ideal brake force distribution line L1, the front wheels WF and the rear wheels WR simultaneously lock up.

In FIG. 2, a straight line L2 is a line of an actual friction brake force distribution owing to the friction brake device 30, and is referred to as a "friction brake force distribution line L2". The friction brake force distribution line L2 is designed/determined to avoid a state where the rear wheels WR lock up before the front wheels WF lock up. If the rear wheels WR lock up before the front wheels WF lock up, the behavior of the vehicle 10 becomes unstable. In view of this, the friction brake force distribution line L2 is designed/determined in such a manner that a "ratio of the front wheel brake force Fbf to the rear wheel brake force Fbr" on (or represented by) the friction brake force distribution line L2 is larger than a "ratio of the front wheel brake force Fbf to the rear wheel brake force Fbr" on (or represented by) ideal brake force distribution line L1. Furthermore, the friction brake force distribution line L2 is designed/determined in such a manner that the "ratio of the front wheel brake force Fbf to the rear wheel brake force Fbr" on (or represented by) the friction brake force distribution line L2 is constant (i.e., the friction brake force distribution line L2 shown in FIG. 2 is straight).

In FIG. 2, a straight line L3 is a line connecting specific points with each other. Namely, a sum (Fbf+Fbr) of the front wheel brake force Fbf and the rear wheel brake force Fbr remains the same on/at any of the specific points on the line L3. The line L3 is referred to as a "constant deceleration line L3". The line L3 shown in FIG. 2 intersects with an abscissa axis indicating the front wheel brake force Fbf at a point where the front wheel brake force Fbf is equal to 4000 N. Therefore, the sum (Fbf+Fbr) of the front wheel brake force Fbf and the rear wheel brake force Fbr is always equal to 4000 N if the front wheel brake force Fbf and the rear wheel brake force Fbr vary along/on the constant deceleration line L3. In other words, the constant deceleration line L3 is made of points wherein a total brake force applied to the vehicle 10 is constant on any of the points on the line L3. Since the deceleration of the vehicle 10 is proportional to the total brake force applied to the vehicle 10, it can be said that the constant deceleration line L3 is made of points wherein the deceleration of the vehicle 10 is constant if the front wheel brake force Fbf and the rear wheel brake force Fbr are on the line L3.

As described above, the first apparatus is configured to use/utilize the regeneration brake force Frgn generated by the regeneration brake device 20 more preferentially than the friction brake force Ffrc generated by the friction brake device 30, in order to recover the regenerated electric power as much as possible to improve energy efficiency. The regeneration brake force Frgn is applied to only the front wheels WF. Therefore, when the brake pedal 52a starts to be depressed, the first apparatus increases only the front wheel brake force Fbf from an origin of the graph shown in FIG. 2 and along a regeneration brake distribution line L4 which is on the abscissa axis of the graph. In this example, the maximum regeneration brake force Frgnmax is equal to 4000 N.

Accordingly, when the front wheel brake force Fbf (which is equal to the regeneration brake force Frgn in this case) reaches (increases up to) 4000 N that is the maximum regeneration brake force Frgnmax in a case where the required brake force Freq required by the driver is a value (e.g., 5000 N) larger than the maximum regeneration brake force Frgnmax, the first apparatus starts to generate (increase) the friction brake force Ffrc while maintaining the regeneration brake force Frgn unchanged (i.e., at the same force as the maximum regeneration brake force Frgnmax). Consequently, the regeneration brake distribution line L4 starts to rise (increase) from the point at which the front wheel brake force Fbf is equal to the maximum regeneration brake force Frgnmax (4000 N) with/at an inclination that is the same as the inclination of the friction brake force distribution line L2, until the friction brake force Ffrc reaches 1000 N (refer to a point P0).

In FIG. 2, a straight line L5 is a line showing the front wheel brake force Fbf of when the rotational speed (thus, the wheel speed) of the front wheels WF rapidly decreases so that the front wheels WF lock up, and is referred to as a "front wheel lock-up boundary line L5". A value (front wheel brake force) of a point at which the front wheel lock-up boundary line L5 intersects with the abscissa axis correlates with the friction coefficient μ of a road surface on which the vehicle 10 is running. The front wheel lock-up boundary line L5 moves leftward in the graph (i.e., is positioned closer to the origin) as the friction coefficient μ of the road surface becomes lower. In the example shown in FIG. 2, the front wheel lock-up boundary line L5 corresponds to the low μ road. In FIG. 2, the front wheel lock-up boundary line L5 intersects with the abscissa axis at a point where the front wheel brake force Fbf is equal to 3500 N. Namely, the front wheel brake force Fbf for the front wheel lock-up boundary is smaller than the maximum regeneration brake force Frgnmax.

Both of the wheel speed Vwf of the front wheels WF and an acceleration of the front wheels DVwf (hereinafter, referred to as a "front wheel acceleration DVwf") decrease when the front wheel brake force Fbf increases and approaches the front wheel lock-up boundary line L5 while the regeneration brake is being performed. The first apparatus is configured to determine whether or not the front wheels WF are about/likely to lock up (i.e., detects the lock-up tendency of the front wheels WF) based on the front wheel acceleration DVwf. More specifically, the first apparatus acquires/calculates, as the front wheel acceleration DVwf, an average of an acceleration of the front left wheel WFL and an acceleration of the front right wheel WFR. The first apparatus determines that the front wheels WF are about/likely to lock up, when the front wheel acceleration DVwf is/becomes equal to or smaller than a first acceleration threshold DVth11 which is a negative value (i.e., DVth11<0). In this example, the first acceleration threshold DVth11 is set at a value (e.g., −0.24 G: G is a gravity acceleration) that is 20% lower than a value (e.g., −0.2 G) corresponding to the lock-up boundary on the low μ road.

The first acceleration threshold DVth11 is set (determined in advance) at a value such that the front wheel acceleration DVwf becomes lower than the first acceleration threshold DVth11 immediately before a time point at which the wheel speed Vwf of the front wheels WF greatly decreases and the front wheels WF start to lock up (namely, at which the ABS control should start). Note that a determination on whether or not a wheel starts to lock up is typically made based on determining whether or not a slip ratio of the wheel calculated from the wheel speed becomes larger than a predetermined slip ratio threshold. To the contrary, the first apparatus is configured to determine whether or not the front wheels WF is about/likely to lock up using the front wheel acceleration DVwf, before the slip ratio of the front wheels WF becomes larger than the slip ratio threshold. It should be noted that a state where the front wheels WF is about/likely to lock up means a state where the front wheels WF is in the lock-up tendency (or the a lock-up tendency of the front wheels WF is detected). Thus, even if the front wheels WF is in the lock-up tendency, the front wheels WF do not necessary lock up thereafter.

Figure 3:
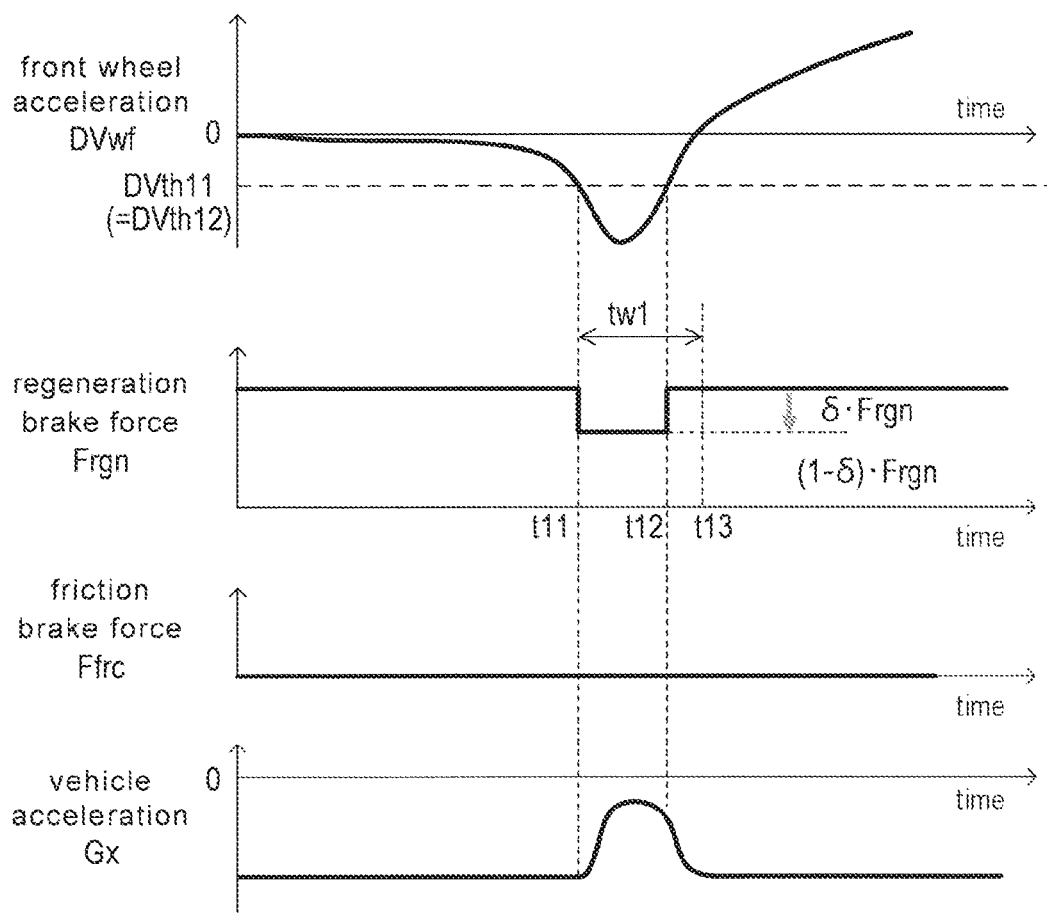
FIG. 3 is a timing chart showing front wheel acceleration, regeneration brake force, friction brake force, and vehicle acceleration, when brake is carried out while the vehicle is running on the low μ road.
Figure 4A:
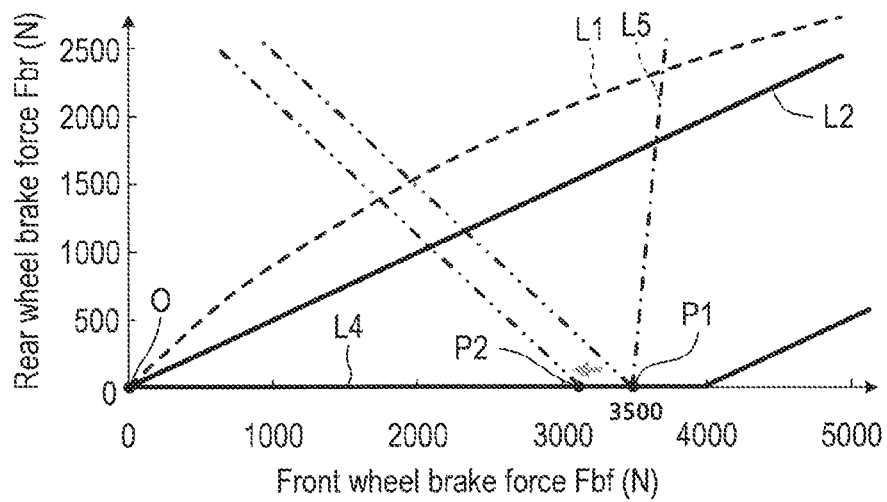
FIG. 4A shows relationships between the front wheel brake force and the rear wheel brake force, to describe a case where the regeneration brake force is decreased.

As shown in FIG. 3, the first apparatus decreases the target regeneration brake force Frgnt by the amount (or a first predetermined amount) corresponding to (according to) a predetermined ratio δ, at a time point t11 at which the front wheel acceleration DVwf varies from a value larger than the first acceleration threshold DVth11 to a value equal to or smaller than the first acceleration threshold DVth11. More specifically, the target regeneration brake force Frgnt is decreased at the time point t11 by the first predetermine amount which is equal to a product of the ratio δ and the required brake force Freq (which is equal to the target regeneration brake force Frgnt at that time point). This control may be referred to as a "brake force decreasing control". At this time point, as shown in FIG. 4A, the front wheel brake force Fbf moves from a point P1 to a point P2. The predetermined ratio δ is set at a value that is unlikely to cause the driver to feel a feeling of strangeness. According to the study of the inventor(s), the predetermined ratio δ is in a range from 10% to 15%. Referring back to FIG. 3, the vehicle acceleration Gx increases (magnitude (absolute value) of the vehicle acceleration Gx becomes smaller) after the time point t11, however, a change amount in the vehicle acceleration Gx is relatively small.

It is considered that the front wheels WF are no longer in the lock-up tendency when/if the acceleration of the front wheels DVwf starts increasing after the time point t11, whereas, it is considered that the front wheels WF are still in the lock-up tendency when/if the acceleration of the front wheels DVwf continues decreasing after the time point t11. More specifically, it can be determined that the front wheels WF are not in the lock-up tendency (or the front wheels WF become unlikely to lock up, or the lock-up tendency of the front wheels WF has disappeared), when/if the acceleration of the front wheels DVwf becomes larger than a second acceleration threshold DVth12 that is substantially equal to the first acceleration threshold DVth11 at a time point t12 which is in a period from the time point (first time point) t11 to a time point (second time point) t13 at which a predetermined time tw1 elapses from the time point t11.

Figure 4B:
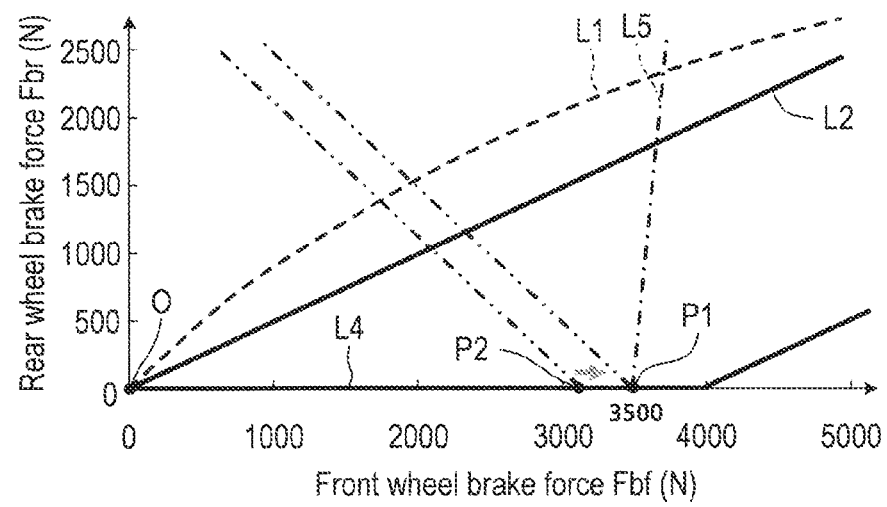
FIG. 4B shows relationships between the front wheel brake force and the rear wheel brake force, to describe a case where the regeneration brake force is increased after it is decreased.

In view of the above, at the time point t12, the first apparatus turns back (increases/sets) the regeneration brake force Frgn to the previous value. More specifically, the first apparatus increases the target regeneration brake force Frgnt in such a manner that the target regeneration brake force Frgnt coincides with the required brake force Freq (calculated at the time point t11), if the acceleration of the front wheels DVwf becomes larger than the second acceleration threshold DVth12 in the period from the time point t11 to the time point t13. This control may be referred to as a "brake force recovery control". At this time point, as shown in FIG. 4B, the front wheel brake force Fbf moves from the point P2 to the point P1. As mentioned above, the responsiveness of the regeneration brake force is higher than the responsiveness of the friction brake force. Therefore, the regeneration brake force Frgn can be decreased and increased relatively quickly/rapidly (refer to FIG. 3, time points t11, t13).

Consequently, the vehicle acceleration Gx returns to the previous value. In this manner, the first apparatus is configured to vary the target regeneration brake force Frgnt to control the regeneration brake force Frgn (that is the front wheel brake force Fbf) based on the determination on the lock-up tendency of the front wheels WF that is made before the slip ratio of the front wheels WF becomes larger than the predetermined slip ratio threshold (or before it is determined that the front wheels WF have locked up based on the slip ratio). In the period from the time point t11 to the time point t12 or to the time point t13 at the longest (that is, when the regeneration brake force Frgn is kept at the decreased value), the target wheel friction brake force Ffrct remains at zero so that the rear wheel brake force Fbr remains unchanged.

Figure 5:
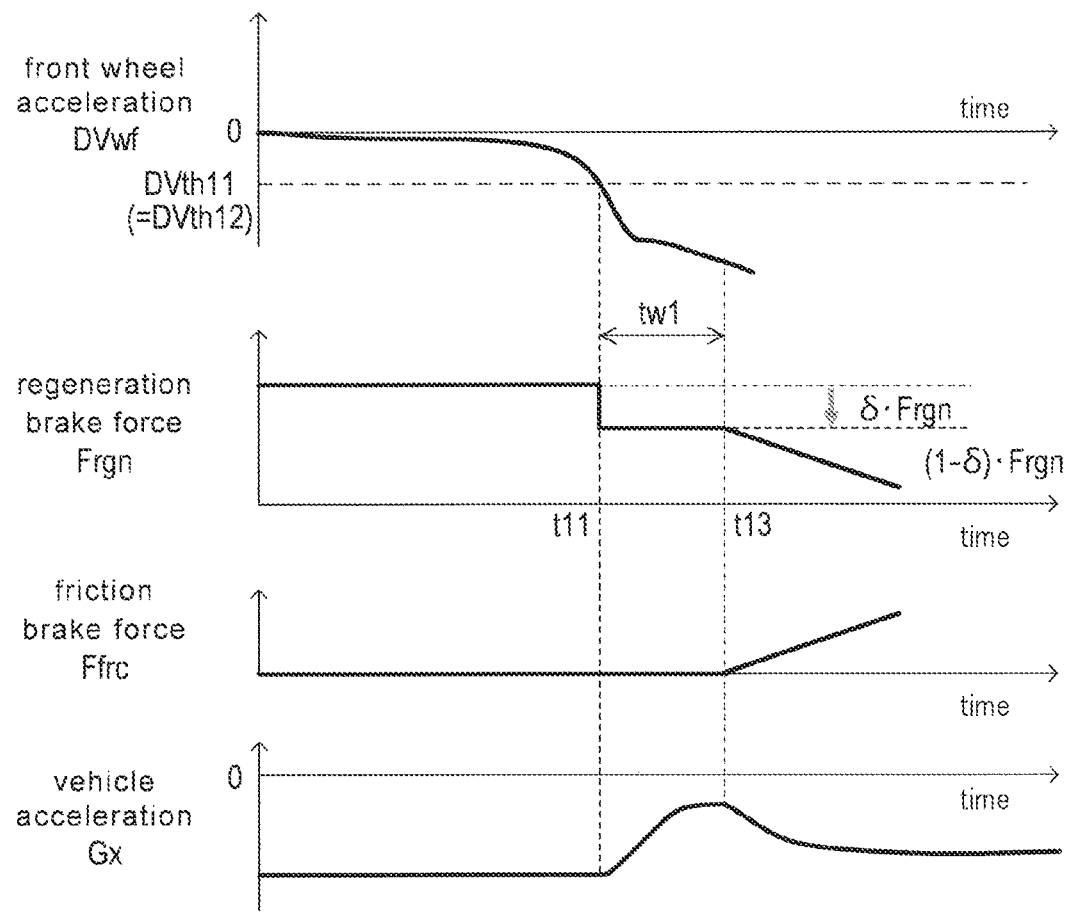
FIG. 5 is another timing chart showing front wheel acceleration, regeneration brake force, friction brake force, and vehicle acceleration, when brake is carried out while the vehicle is running on the low μ road.

Meanwhile, as shown in FIG. 5, it is considered that the front wheels WF continues being in the lock-up tendency at the time point t13 at which the predetermined time tw1 elapses from the time point t11, when/if the acceleration of the front wheels DVwf does not become larger than the second acceleration threshold DVth12 in the period from the time point t11 to the time point t13. In this case, from the time point t13, the first apparatus decreases the target regeneration brake force Frgnt at a predetermined rate, and increases the target wheel friction brake force Ffrct at the predetermined rate. Namely, the first apparatus replaces a part of the target regeneration brake force Frgnt with a part of the target wheel friction brake force Ffrct. This control may be referred to as a "brake force replacing control".

Figure 6A:
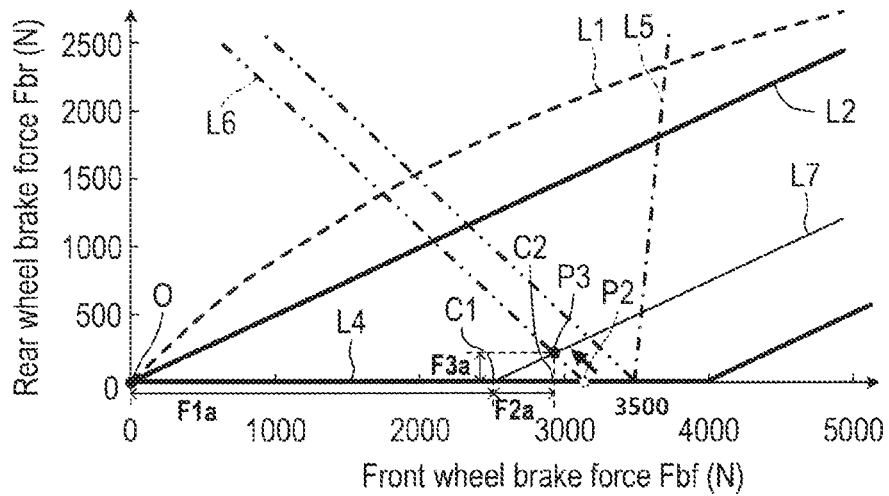
FIG. 6A shows relationships between the front wheel brake force and the rear wheel brake force, to describe a case where a replacement of a part of the regeneration brake force with a part of the friction brake force is started.

It is now assumed that the required brake force Freq remains unchanged. As shown in FIG. 6A, after the brake force replacing control is started under this assumption, a point indicated by the front wheel brake force Fbf and the rear wheel brake force Fbr is varied from a point P2 to a point P3. At this time, a ratio between the front wheel friction brake force Ffrcf and the rear wheel friction brake force Ffrcr is maintained at a ratio represented by the friction brake force distribution line L2. A length F1a between an intersection point C1 and the origin O corresponds to the regeneration brake force Frgn. The intersection point C1 is a point at which a straight line L7 intersects with the abscissa axis, wherein the straight line L7 passes through the point P3 and is parallel to the friction brake force distribution line L2. A length F2a between the intersection point C1 and an intersection point C2 corresponds to the front wheel friction brake force Ffrcf. The intersection point C2 is a point at which a perpendicular line to the abscissa axis intersects with the abscissa axis, the perpendicular line passing through the point P3. A length F3a from the point P3 to the abscissa axis along the perpendicular line corresponds to the rear wheel friction brake force Ffrcr.

Figure 6B:
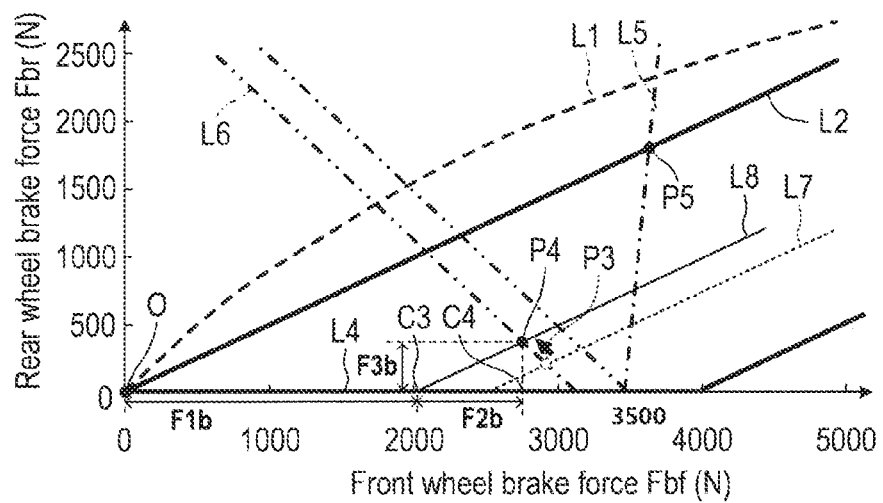
FIG. 6B shows relationships between the front wheel brake force and the rear wheel brake force, to describe a case where the replacement of a part of the regeneration brake force with a part of the friction brake force continues to be carried out.

As shown in FIG. 6B, when the brake force replacing control is further continued, a point indicated by the front wheel brake force Fbf and the rear wheel brake force Fbr is varied from the point P3 to a point P4. A length F1b between an intersection point C3 and the origin O corresponds to the regeneration brake force Frgn. The intersection point C3 is a point at which a straight line L8 intersects with the abscissa axis, wherein the straight line L8 passes through the point P4 and is parallel to the friction brake force distribution line L2. A length F2b between the intersection point C3 and an intersection point C4 corresponds to the front wheel friction brake force Ffrcf. The intersection point C4 is a point at which a perpendicular line to the abscissa axis intersects with the abscissa axis, the perpendicular line passing through the point P4. A length F3b from the point P4 to the abscissa axis along the perpendicular line corresponds to the rear wheel friction brake force Ffrcr. In this manner, the brake force replacing control decreases the regeneration brake force Frgn, and increases the front wheel friction brake force Ffrcf and the rear wheel friction brake force Ffrcr. However, the brake force replacing control does not change the total brake force, and thus, the front wheel brake force Fbf and the rear wheel brake force Fbr vary along a constant deceleration line L6. Consequently, as shown in FIG. 5, the absolute value (the magnitude) of the vehicle acceleration Gx gradually increases after the time point t13.

The first apparatus thus configured to increase a ratio of the rear wheel brake force Fbr to the total brake force (i.e., required brake force Freq) without causing the driver to feel a feeling of strangeness to avoid/prevent the lock-up of the front wheels WF. It should be noted that the above numerical values for the maximum regeneration brake force Frgnmax, the first acceleration threshold DVth11, and the second acceleration threshold DVth12 are just examples, and the first apparatus should not be limited by those values.

(Specific Operation)

The specific operation of the first apparatus will next be described. The CPU (hereinafter, simply referred to as the "CPU") of the brake ECU 50 is configured to execute a "first brake force distribution control routine" shown by a flowchart in FIG. 7, every time a constant time (e.g., 20 ms) elapses. Values of a first flag X1 and a second flag X2, described later, are set to "0" in an unillustrated initialization routine separately executed by the CPU.

The CPU starts processing of step 700 at an appropriate timing, and proceeds to step 710 to step 740, sequentially. The processes of steps 710 to 740 are realized by respective sub routines shown in respective FIGS. 8 to 11. Thereafter, the CPU proceeds to step 795 to terminate the present routine tentatively.

Figure 8:
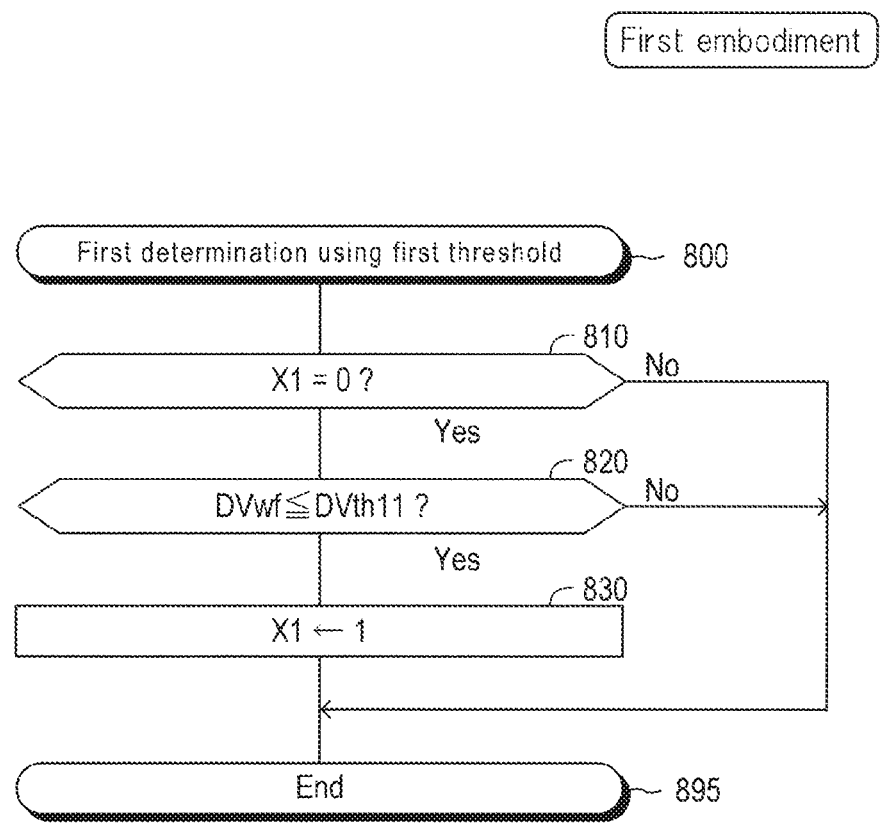
FIG. 8 is a flowchart representing a "first determination routine using a first threshold" executed by the CPU of the brake ECU shown in FIG. 1.

Step 710: the CPU executed a first determination process using the first threshold shown in FIG. 8.

Figure 9:
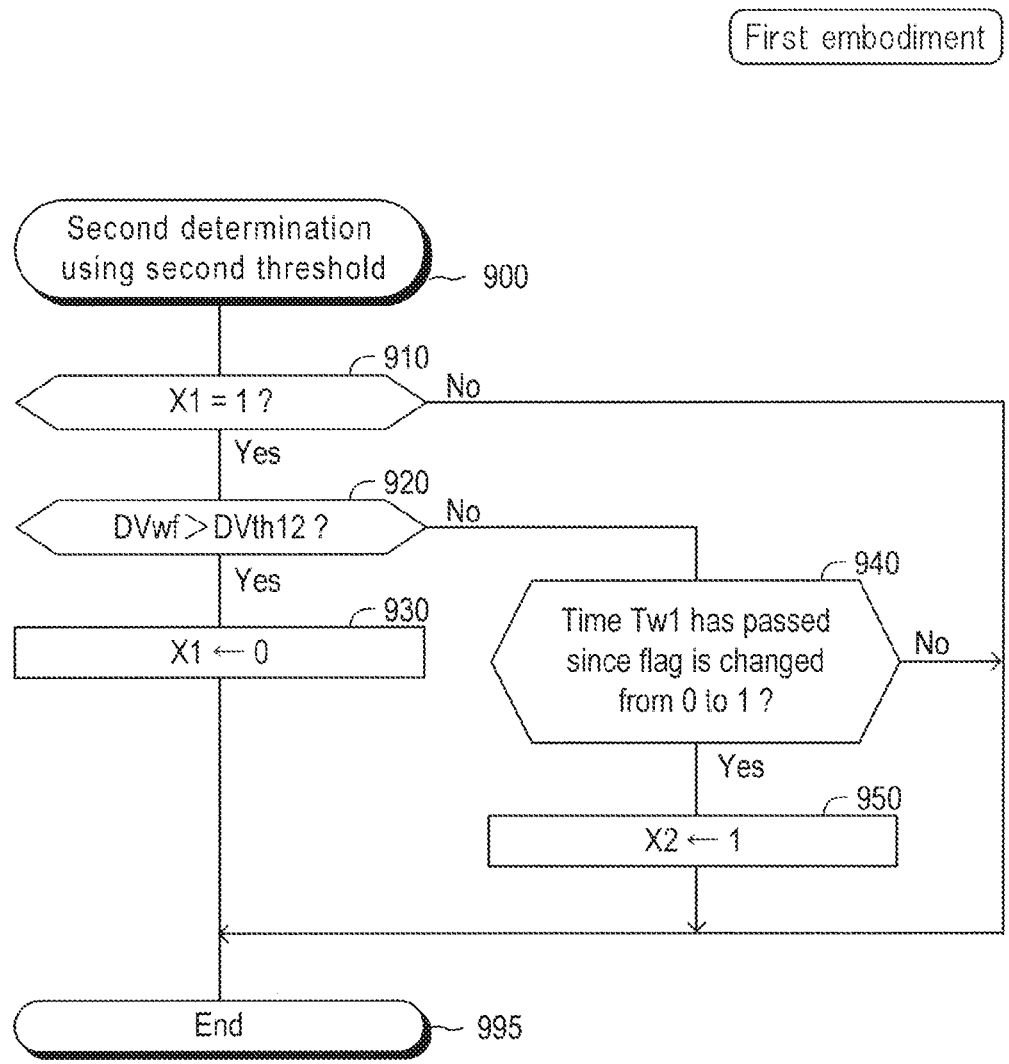
FIG. 9 is a flowchart representing a "second determination routine using a second threshold" executed by the CPU of the brake ECU shown in FIG. 1.

Step 720: the CPU executed a second determination process using the second threshold shown in FIG. 9.

Figure 10:
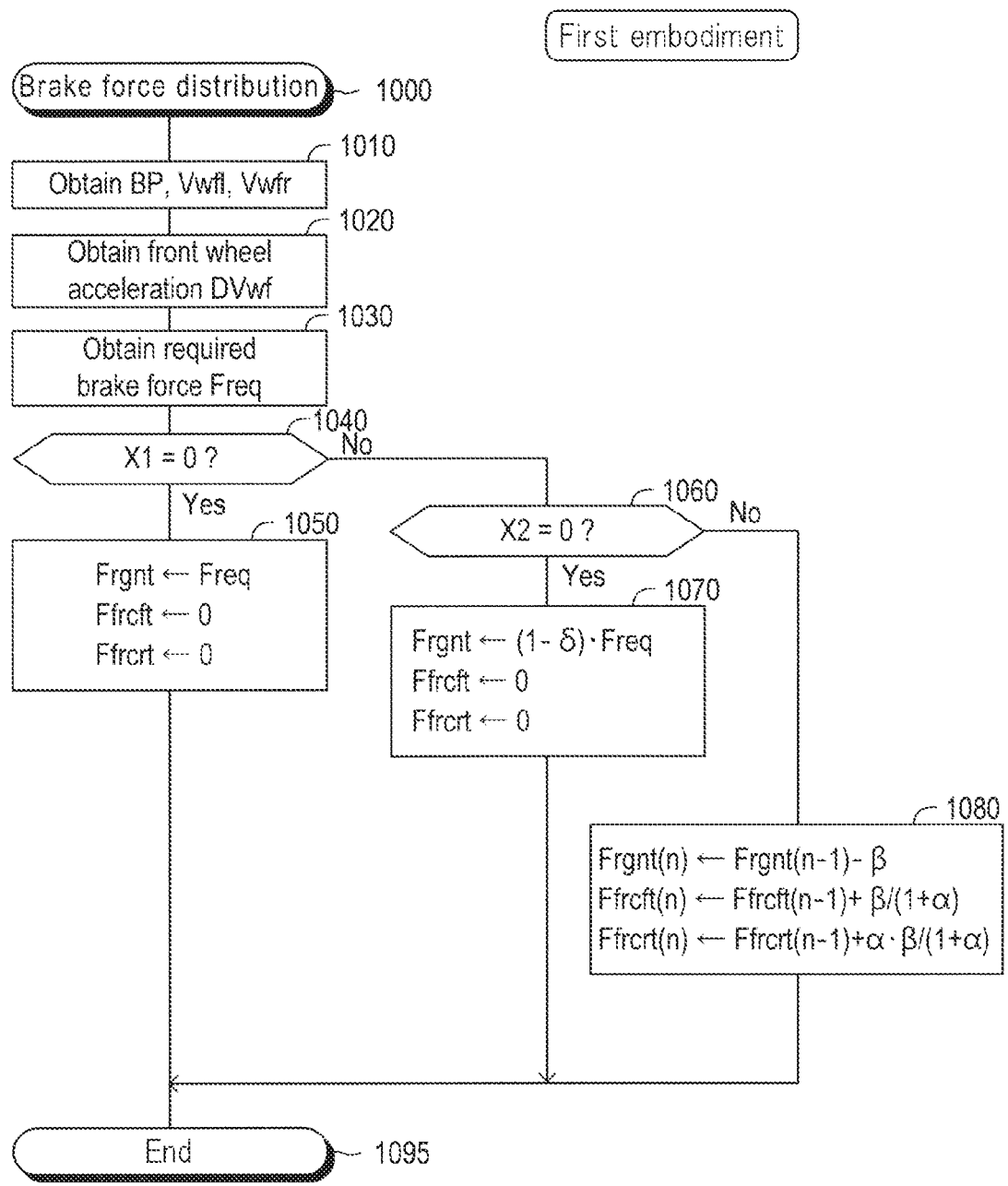
FIG. 10 is a flowchart representing a "brake force distribution routine" executed by the CPU of the brake ECU shown in FIG. 1.

Step 730: the CPU executed a brake force distribution process shown in FIG. 10.

Figure 11:
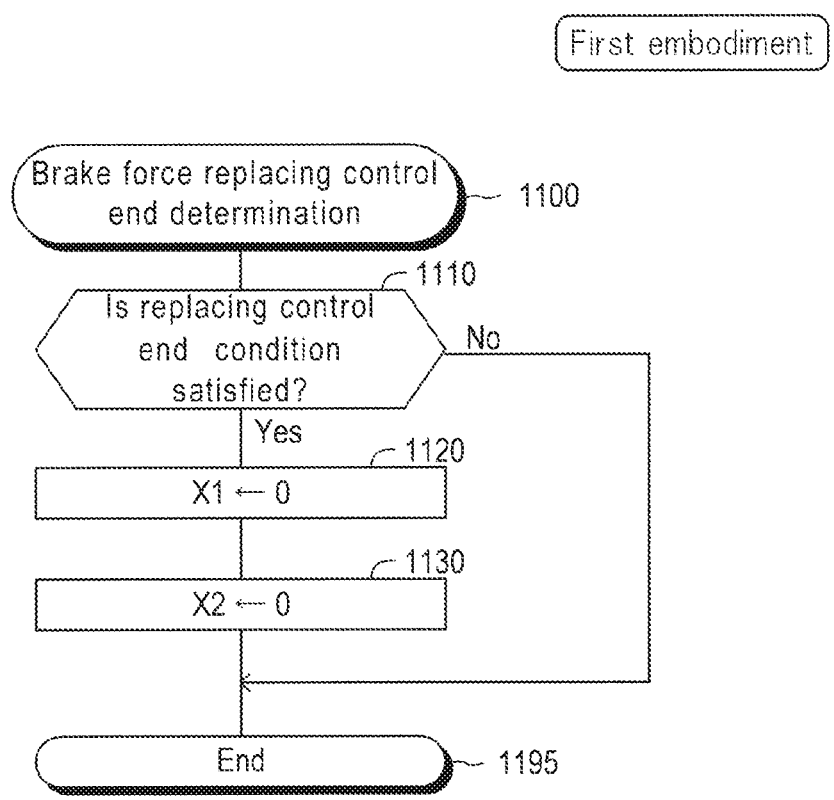
FIG. 11 is a flowchart representing a "brake force replacing control end determination routine" executed by the CPU of the brake ECU shown in FIG. 1.

Step 740: the CPU executed a brake force replacing control end determination process shown in FIG. 11.

(Case 1) A case where the front wheel acceleration is larger than the first acceleration threshold When the CPU proceeds to step 710, the CPU proceeds to step 800 shown in FIG. 8. Thereafter, the CPU proceeds to step 810 and determines whether or not the value of the first flag X1 is "0". At this time point, the value of the first flag X1 is "0". Thus, the CPU makes a "Yes" determination at step 810 to proceed to step 820. At step 820, the CPU determines whether or not the front wheel acceleration DVwf is equal to or smaller than the first acceleration threshold DVth11.

According to the case 1 described above, the front wheel acceleration DVwf is larger than the first acceleration threshold DVth11. Therefore, the CPU makes a "No" determination at 820 so as to directly proceeds to step 895. Namely, in this case, the value of the first flag X1 is maintained at "0".

Subsequently, the CPU proceeds to step 720 shown in FIG. 7 to proceeds step 910 shown in FIG. 9 through step 900. At step 910, the CPU determines whether or not the value of the first flag X1 is "1". At this time point, the value of the first flag X1 is "0". Thus, the CPU makes a "No" determination at step 910 and directly proceeds to step 995.

Subsequently, the CPU proceeds to step 730 shown in FIG. 7 to proceed step 1000 shown in FIG. 10 and executes step 1010 to step 1030 sequentially. Thereafter, the CPU proceeds to step 1040.

Step 1010: the CPU acquires/obtains the brake pedal operating amount BP, and calculates the wheel speed Vwfl of the front left wheel WFL and the wheel speed Vwfr of the front right wheel WFR based on the expression (1) described above.

Step 1020: the CPU acquires the front wheel acceleration DVwf based on the following expression (2).

$$DVwf=(dVwfl/dt+dVwfr/dt)/2 \qquad (2)$$

More specifically, the CPU acquires the front wheel acceleration DVwf using the following expression (2A).

$$DVwf=[((Vwfl(n)-Vwfl(n-1))/\Delta t+((Vwfr(n)-Vwfr(n-1))/\Delta t]/\ 2 \qquad (2A)$$

wherein:

$\Delta t$ is a calculation period of time;

Vwfl(n) is the currently acquired wheel speed Vwfl of the front left wheel WFL (at the present time point);

Vwfl(n−1) is the previously acquired wheel speed Vwfl of the front left wheel WFL (wheel speed Vwfl obtained at a time point the calculation period of time $\Delta t$ before the present time point);

Vwfr(n) is the currently acquired wheel speed Vwfr of the front right wheel WFR (at the present time point); and Vwfr(n−1) is the previously acquired wheel speed Vwfr of the front right wheel WFR (wheel speed Vwfr obtained at a time point the calculation period of time $\Delta t$ before the present time point).

Step 1030: the CPU acquires/obtains the required brake force Freq based on the brake pedal operating amount BP, the vehicle speed SPD, and the dynamic radius r of each of the wheels, as described above.

At step 1040, the CPU determines whether or not the value of the first flag X1 is "0". As described above, the value of the first flag X1 is "0" in this case. Thus, the CPU makes a "Yes" determination at 1040 to proceed to step 1050. At step 1050, the CPU distributes/allocates the required brake force Freq to the target regeneration brake force Frgnt, the target front wheel friction brake force Ffrcft, and the target rear wheel friction brake force Ffrcrt, according to the following expressions (3) to (5). That is, in this case, all of the required brake force Freq is allocated to the target regeneration brake force Frgnt. Thereafter, the CPU proceeds to step 1095 and proceeds to step 740 shown in FIG. 7.

$$Frgnt=Freq \qquad (3)$$

$$Ffrcft=0 \qquad (4)$$

$$Ffrcrt=0 \qquad (5)$$

Figure 7:
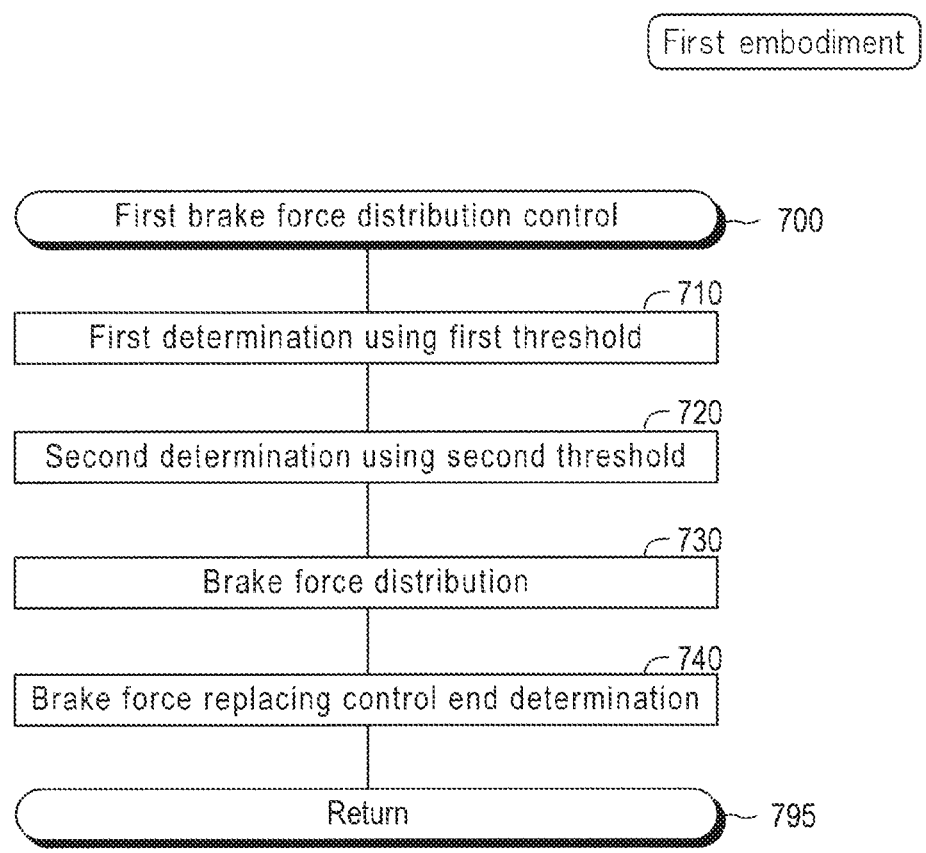
FIG. 7 is a flowchart representing a "first brake force distribution control routine" executed by a CPU of the brake ECU shown in FIG. 1.

At step 740 shown in FIG. 7, the CPU proceeds to step 1110 shown in FIG. 11 through step 1100, and determines whether or not a replacing control ending condition is satisfied. The replacing control ending condition is satisfied when at least one of the following conditions is satisfied while the value of the second flag X2 is "1".

The target regeneration brake force Frgnt has reached zero.

The front wheel acceleration DVwf has become equal to or larger than a predetermined acceleration threshold (due to an increase of the front wheel acceleration DVwf).

The required brake force Freq has become equal to or smaller than a predetermined required brake force threshold (due to an decrease of the brake pedal operating amount BP).

At this time point, the value of the second flag X2 is "0", and the brake force replacing control is not being executed Therefore, the CPU makes a "No" determination at step 1110, and directly proceeds to step 1195 so as to proceed to step 795 shown in FIG. 7.

(Case 2) A case where the front wheel acceleration has become equal to or smaller than the first acceleration threshold.

When the CPU proceeds to step 710 from step 700, the CPU proceeds to step 810 shown in FIG. 8 through step 800. The CPU makes a "Yes" determination at step 810 to proceed to step 820. In the case 2, the front wheel acceleration DVwf has become equal to or smaller than the first acceleration threshold DVth11. Therefore, the CPU makes a "Yes" determination at step 820 to proceed to step 830. At step 830, the CPU sets the value of the first flag X1 to "1".

Thereafter, the CPU proceeds to step 910 through step 895, step 710, step 720, and step 900. At step 910, the CPU makes a "Yes" determination to proceed to step 920, at which the CPU determines whether or not the front wheel acceleration DVwf is larger than the second acceleration threshold DVth12. As described above, the second acceleration threshold DVth12 is set at the value equal to the first acceleration threshold DVth11. Thus, at this time point, the CPU makes a "No" determination at step 920 and proceeds to step 940 to determine whether or not the first predetermined time tw1 has elapsed from the time point t11 at which the value of the first flag X1 was changed from "0" to "1".

In the case 2 described above, the elapsed time from the first time point t11 is almost zero (or shorter than the first predetermined time tw1). Therefore, the CPU makes a "No" determination at step 940 so as to directly proceeds to step 995. Subsequently, the CPU proceeds to step 1000 shown in FIG. 10 through step 995, step 720, and step 730, and executes step 1010 to step 1030 sequentially. Thereafter, the CPU proceeds to step 1040. At this time point, the value of the first flag X1 is "1", and thus, the CPU makes a "No" determination at step 1040 to proceed to step 1060. At step 1060, the CPU determines whether or not the value of the second flag X2 is "0".

At this time point, the value of the second flag X2 is "0". Therefore, the CPU makes a "Yes" determination at step 1060 and proceeds to step 1070. At step 1070, the CPU distributes/allocates the required brake force Freq to the target regeneration brake force Frgnt, the target front wheel friction brake force Ffrcft, and the target rear wheel friction brake force Ffrcrt, according to the following expressions (6) to (8).

$$Frgnt = (1-\delta) \cdot Freq \quad (6)$$

$$Ffrcft = 0 \quad (7)$$

$$Ffrcrt = 0 \quad (8)$$

Namely, the CPU decreases the target regeneration brake force Frgnt by the amount determined by the predetermined ratio $\delta$ (i.e., the amount which is equal to a product ($\delta \cdot$Freq) of the ratio $\delta$ and the required brake force Freq). The ratio $\delta$ is set at the appropriate value (e.g., 10%), and thus, the decrease of the regeneration brake force Frgn caused by the decrease of the target regeneration brake force Frgnt is not too large. Accordingly, the decrease of the regeneration brake force Frgn does not cause the driver to feel a feeling of strangeness. In addition, the CPU sets each of the target front wheel friction brake force Ffrcft and the target rear wheel friction brake force Ffrcrt to "0". In other words, the CPU does not change the target front wheel friction brake force Ffrcft and the target rear wheel friction brake force Ffrcrt at this time point.

(Case 3) A case where the front wheel acceleration that became smaller than the first acceleration threshold has become larger than the second acceleration threshold, before the first predetermined time elapses.

When the CPU proceeds to step 710 from step 700, the CPU proceeds to step 810 shown in FIG. 8 through step 800. At step 810, the CPU makes a "No" determination at step 810 to directly proceed to step 895. Thereafter, the CPU proceeds to step 910 shown in FIG. 9 through step 710, step 720, and step 900. At step 910, the CPU makes a "Yes" determination to proceed to step 920. In the case 3 described above, the front wheel acceleration DVwf is larger than the second acceleration threshold DVth12. Therefore, the CPU makes a "Yes" determination at step 920, and proceed to step 930. At step 930, the CPU sets the value of the first flag X1 to "0", and proceeds to step 995.

Subsequently, the CPU proceeds to step 1000 shown in FIG. 10 through step 995, step 720, and step 730, and executes step 1010 to step 1030 sequentially. Thereafter, the CPU proceeds to step 1040. At this time point, the value of the first flag X1 is "0", and thus, the CPU makes a "Yes" determination at step 1040 to proceed to step 1050. At step 1050, the CPU sets the target regeneration brake force Frgnt to the required brake force Freq, and sets each of the target front wheel friction brake force Ffrcft, and the target rear wheel friction brake force Ffrcrt to zero, according to the above expressions (3) to (5).

(Case 4) A case where the front wheel acceleration that became smaller than the second acceleration threshold has not become larger than the second acceleration threshold before the first predetermined time elapsed.

When the CPU proceeds to step 910 shown in FIG. 9, the CPU makes a "Yes" determination at step 910, and proceeds to step 920. In the case 4 described above, the front wheel acceleration DVwf is equal to or smaller than the second acceleration threshold DVth12. Therefore, the CPU makes a "No" determination at step 920 to proceed to step 940, and makes a "Yes" determination at step 940 to proceed to step 950. At step 950, the CPU sets the value of the second flag X2 to "1" and proceeds to step 995.

Subsequently, the CPU proceeds to step 1000 shown in FIG. 10 through step 995, step 720, and step 730, and executes step 1010 to step 1030 sequentially. Thereafter, the CPU proceeds to step 1040. At this time point, the value of the first flag X1 is "1", and thus, the CPU makes a "No" determination at step 1040 to proceed to step 1060. At this time point, the value of the second flag X2 is "1", and thus, the CPU makes a "No" determination at step 1060 to proceed to step 1080. At step 1080, the CPU executes the brake force replacing control described below.

<Brake Force Replacing Control>

The CPU decreases the target regeneration brake force Frgnt at a predetermined rate. Furthermore, the CPU increases the target wheel friction brake force Ffrct (that is a sum of the target front wheel friction brake force Ffrcft and the target rear wheel friction brake force Ffrcrt) at the predetermined rate. Thereby, the a ratio of the front wheel brake force Fbf to the total brake force is decreased, and a ratio of the rear wheel brake force Fbr to the total brake force is increased.

More specifically, in the brake force replacing control, the CPU decreases the target regeneration brake force Frgnt by a value β every elapse of one calculation cycle Δt, and increases the target wheel friction brake force Ffrct (that is the sum of the target front wheel friction brake force Ffrcft and the target rear wheel friction brake force Ffrcrt) by the value β every elapse of one calculation cycle Δt. Therefore, during the brake force replacing control, an expression (9) described below is satisfied, between a "target regeneration brake force Frgnt(n−1) that is the target regeneration brake force Frgnt at a time point the one calculation cycle Δt before the present time point" and a "target regeneration brake force Frgnt(n) that is the target regeneration brake force Frgnt at the present time point". Furthermore, an expression (10) described below is satisfied, between a "target wheel friction brake force Ffrct(n−1) that is the target wheel friction brake force Ffrct at the time point the one calculation cycle Δt before the present time point" and a "target wheel friction brake force Ffrct(n) that is the target wheel friction brake force Ffrct at the present time point".

$$\text{Frgnt}(n) = \text{Frgnt}(n-1) - \beta \tag{9}$$

$$\text{Ffrct}(n) = \text{Ffrct}(n-1) + \beta \tag{10}$$

Meanwhile, the CPU increases the target front wheel friction brake force Ffrcft and the target rear wheel friction brake force Ffrcrt while the CPU maintains a ratio between them at the constant value corresponding to the inclination of the friction brake force distribution line L2. Namely, when the inclination of the friction brake force distribution line L2 is "a", an expression (11) described below is maintained, between the target front wheel friction brake force Ffrcft and the target rear wheel friction brake force Ffrcrt.

$$\text{Ffrcrt} = \alpha \cdot \text{Ffrcft} \tag{11}$$

Accordingly, expressions (12) and (13) described below are obtained from the above expressions (10) and (11).

$$\text{Ffrcft}(n) = \text{Ffrcft}(n-1) + \beta/(1+\alpha) \tag{12}$$

$$\text{Ffrcrt}(n) = \text{Ffrcrt}(n-1) + \alpha \cdot \beta/(1+\alpha) \tag{13}$$

The CPU determines the target regeneration brake force Frgnt(n), the target front wheel friction brake force Ffrcft, and the target rear wheel friction brake force Ffrcrt, according to the expressions (9), (12), and (13). Consequently, a ratio of the front wheel brake force Fbf (=Frgn+Ffrcf) to the total brake force is decreased, and a ratio of the rear wheel brake force Fbr (=Ffrcr) to the total brake force is increased.

The above description is based on the premises that the required brake force Freq remains unchanged. In actuality, the required brake force Freq may increase during the brake force replacing control. For instance, if the required brake force Freq increases by an amount "ΔFreq", the target values are determined in accordance with the following expressions (14) to (16). It should be noted that the target regeneration brake force Frgnt(n) is determined in such a manner that the target regeneration brake force Frgnt(n) does not become larger than the value (1−δ)·Freq.

$$\text{Frgnt}(n) = \text{Frgnt}(n-1) - \beta + \delta \cdot \Delta\text{Freq} \tag{14}$$

$$\text{Ffrcft}(n) = \text{Ffrcft}(n-1) + \beta/(1+\alpha) + (1-\delta) \cdot \Delta\text{Freq}/(1+\alpha) \tag{15}$$

$$\text{Ffrcrt}(n) = \text{Ffrcrt}(n-1) + \alpha \cdot \beta/(1+\alpha) + (1-\delta) \cdot \Delta\text{Freq} \cdot \alpha/(1+\alpha) \tag{16}$$

As described above, the first apparatus includes a distributed brake force calculation section 50 (the brake ECU) that is configured to distribute/allocate the required brake force Freq to the target regeneration brake force Frgnt, the target front wheel friction brake force Ffrcft, and the target rear wheel friction brake force Ffrcrt. The distributed brake force calculation section 50 is configured to perform a "first brake force distribution control" described below, when the required brake force Freq is equal to or smaller than the maximum regeneration brake force Frgnmax.

(1) The distributed brake force calculation section 50 allocates all of the required brake force Freq to the target regeneration brake force Frgnt.

(2) The distributed brake force calculation section 50 executes the brake force decreasing control to decrease the target regeneration brake force Frgnt by a first predetermined amount (=δ·Freq), when the front wheel acceleration DVwf varies/decreases from the value larger than the first acceleration threshold DVth11 that is a negative value to the value equal to or smaller than the first acceleration threshold DVth11, while the distributed brake force calculation section 50 is allocating all of the required brake force Freq to the target regeneration brake force Frgnt.

(3) The distributed brake force calculation section 50 executes the brake force recovery control to increase the target regeneration brake force Frgnt in such a manner that the target regeneration brake force Frgnt coincides with the required brake force Freq, if the front wheel acceleration DVwf becomes larger than the second acceleration threshold DVth12 that is equal to or larger than the first acceleration threshold DVth11 in the period from the first time point t11 at which the target regeneration brake force Frgnt is decreased by the first amount (=δ·Freq) to the second time point t13 at which the predetermined time tw11 elapses from the first time point t11.

(4) The distributed brake force calculation section 50 executes, if the front wheel acceleration DVwf has/does not become larger than the second acceleration threshold DVth12 in the period from the time point t11 to the second time point t13, the brake force replacing control to:

decrease the target regeneration brake force Frgnt by a second predetermined amount β every time the predetermined time Δt elapses; and increase the target front wheel friction brake force Ffrcft and the target rear wheel friction brake force Ffrcrt in such a manner that the "sum (Ffrcft+Ffrcrt) of the target front wheel friction brake force Ffrcft and the target rear wheel friction brake force Ffrcrt" is increased by the second predetermined amount β every time the predetermined time Δt elapses while maintaining a proportional relationship (Ffrcrt=α·Ffrcft) between the target front wheel friction brake force Ffrcft and the target rear wheel friction brake force Ffrcrt (or in such a manner that the target front wheel friction brake force Ffrcft and the target rear wheel friction brake force Ffrcrt are proportional to each other).

According to the first apparatus, in a case where the vehicle 10 is decelerating on the low μ road using only the regeneration brake force Frgn, the chances of unnecessary replacing a part of the regeneration brake force Frgn with a part of the friction brake force Ffrc can be reduced when the front wheels is in the lock-up tendency. Consequently, the chances of using the regeneration brake force can be increased to improve the energy efficiency (improve the fuel economy of the vehicle). In addition, the predetermined ratio δ for the first predetermined amount is between 10 to 15%. This allows the first apparatus to prevent the driver from feeling a feeling of strangeness and to reduce a possibility of the lock-up of the front wheels WF.

Second Embodiment

A brake control apparatus (hereinafter, referred to as a "second apparatus") of a vehicle according to a second embodiment of the present disclosure will next be described. The second apparatus is different from the first apparatus in that the second apparatus executes a specific brake control (second brake force distribution control) for the "slip of the front wheels WF" that occurs when the front wheels WF pass through a low μ section/part such as a bump and a manhole in a case where the vehicle 10 is running on a high μ road (e.g., dry asphalt road) and is being braked (hereinafter, referred to as "being slow braked") such that the vehicle is decelerating at a relatively small magnitude of deceleration using only the regeneration brake force. Hereinafter, this difference will mainly be focused.

In the present specification, the "slow braking" means a braking that causes the vehicle to decelerate at a deceleration of 0.2 G to 0.3 G (at an acceleration of −0.2 G to −0.3 G). The required brake force Freq for the slow braking is relatively small, and thus, is satisfied with/by only the regeneration brake force Frgn (and does not need the friction brake force Ffrc). In other words, during the slow braking, all of the required brake force Freq can be allocated/assigned to the regeneration brake force Frgn.

Figure 12:
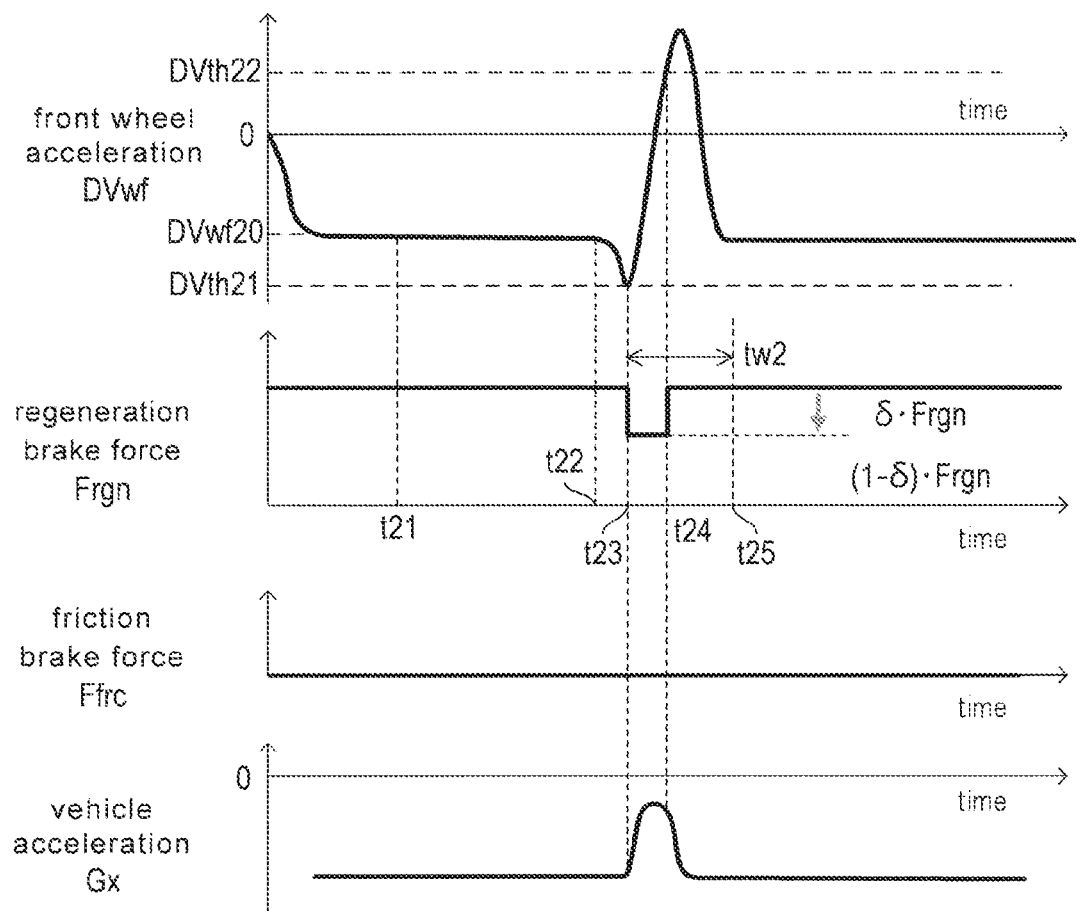
FIG. 12 is a timing chart showing the front wheel acceleration, the regeneration brake force, the friction brake force, and the vehicle acceleration, when brake is carried out while the vehicle is running on the high μ road.

As shown in FIG. 12, the front wheel acceleration DVwf decreases from "0" to "DVwf20" that is, for instance, between −0.2 and −0.3 G, when the slow braking is performed while the vehicle 10 is running on the high μ road. The front wheel acceleration DVwf reaches "DVwf20" around a time point t21.

At a time point t22 after the time point t21, the front wheels WF pass through the low μ section/part that has a relatively short distance/length, and the front wheel acceleration DVwf decreases rapidly. When the front wheel acceleration DVwf becomes equal to or smaller than a first acceleration threshold DVth21 at a time point t23, the second apparatus decreases the target regeneration brake force Frgnt by the amount corresponding to (according to) the predetermined ratio δ (10%-15%) of the required brake force Freq. The first acceleration threshold DVth21 is "−1 G", for instance.

The second apparatus increases the target regeneration brake force Frgnt rapidly, if the front wheel acceleration DVwf becomes larger than a second acceleration threshold DVth22 that is a positive value before a time point t25 at which a predetermined second time tw2 elapses from the time point t23 at which the second apparatus decreases the target regeneration brake force Frgnt by the amount corresponding to the predetermined ratio δ. More specifically, the second apparatus increases the target regeneration brake force Frgnt in such a manner that the target regeneration brake force Frgnt coincides with (becomes equal to) the required brake force Freq at a time point t24. Namely, only the front wheel brake force Fbf varies at this time point, similarly to the example shown in FIG. 4. Thereafter, the slow braking is performed to decelerate the vehicle 10 at the deceleration similar to the deceleration obtained before the vehicle 10 passed through the low μ section. The reason why the front wheel acceleration DVwf rapidly increases to become larger than the second acceleration threshold DVth22 at the time point t24 is that the front wheels WF have already passed through the low μ section and are on the high μ road at the time point t24, and thus, are accelerated due to the high μ road.

Figure 13:
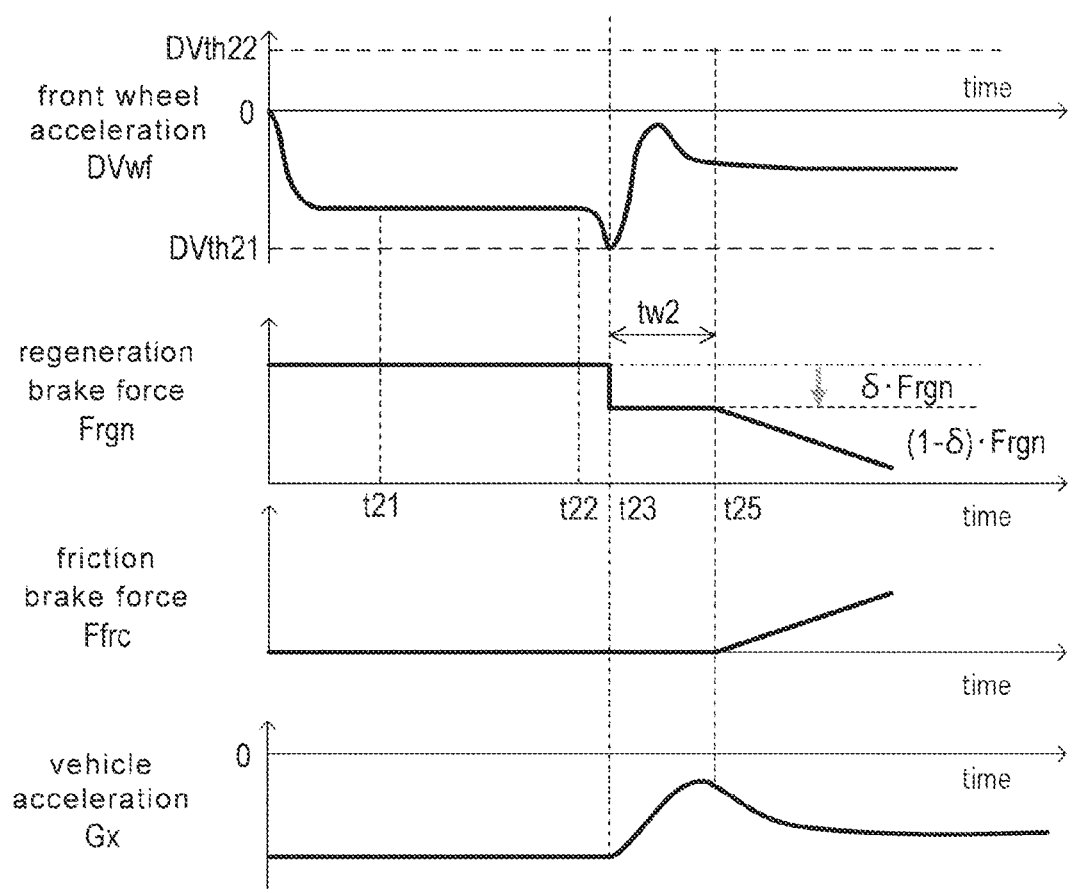
FIG. 13 is another timing chart showing the front wheel acceleration, the regeneration brake force, the friction brake force, and the vehicle acceleration, when brake is carried out while the vehicle is running on the high μ road.

To the contrary, as shown in FIG. 13, the second apparatus starts to replace a part of the target regeneration brake force Frgnt with a part of the target wheel friction brake force Ffrct (i.e., starts to perform the brake force replacing control), if the front wheel acceleration DVwf does not become larger than the second acceleration threshold DVth22 before (by) the time point t25 at which the predetermined second time tw2 elapses from the time point t23 at which the second apparatus decreases the target regeneration brake force Frgnt by the amount corresponding to the predetermined ratio δ. Thereby, the second apparatus can ensure the brake force required/necessary for a low μ road.

Immediately after the second apparatus decreases the target regeneration brake force Frgnt by the amount corresponding to the predetermined ratio δ at the time point t23, the front wheel acceleration DVwf as well as the vehicle acceleration Gx increase temporarily. However, in the example shown in FIG. 13, the front wheels WF are still on the low μ section, and therefore, the front wheel acceleration DVwf starts decreasing again before it reaches the second acceleration threshold DVth22. The reason for this is that the front wheels WF continue being on the low μ section.

(Specific Operation)

The CPU (hereinafter, simply referred to as the "CPU") of the brake ECU 50A of the second apparatus is configured to execute a "second brake force distribution control routine" that are in common with the "first brake force distribution control routine" shown by the flowcharts on FIGS. 7 to 11, except the following points.

The first acceleration threshold DVth21 to which the second apparatus refer is different from the first acceleration threshold DVth11 to which the first apparatus refer. More specifically, the first acceleration threshold DVth21 is lower than the first acceleration threshold DVth11.

The second acceleration threshold DVth22 to which the second apparatus refer is different from the second acceleration threshold DVth21 to which the first apparatus refer. More specifically, the second acceleration threshold DVth22 is a positive value (i.e., a value in the acceleration side and not in the deceleration side), whereas the second acceleration threshold DVth12 is a negative value (i.e., a value in the deceleration side and not in the acceleration side) and is substantially the same as the first acceleration threshold DVth11.

The second predetermined time tw2 is different from the first predetermined time tw1. However, the time tw2 may be the same as the time tw1.

According to the thus configured second apparatus, the chances of unnecessary replacing a part of the regeneration brake force Frgn with a part of the friction brake force Ffrc can be reduced, when the front wheels WF temporarily move on the low μ section, and therefore, the front wheel acceleration DVwf rapidly decreases due to the slip of the front wheels WF in the case where the vehicle 10 is running on the high μ road and is being braked using only the regeneration brake force. Consequently, the chances of using the regeneration brake force can be increased to improve the energy efficiency (improve the fuel economy of the vehicle). In addition, the predetermined ratio δ for the first predetermined amount is between 10 to 15%. This also allows the second apparatus to prevent the driver from feeling a feeling of strangeness and to reduce a possibility of the lock-up of the front wheels WF.

Third Embodiment

A brake control apparatus (hereinafter, referred to as a "third apparatus") of a vehicle according to a third embodiment of the present disclosure will next be described.

The third apparatus is configured to be capable of executing both of the above described first brake force distribution control that the first apparatus executes and the above described second brake force distribution control that the first apparatus executes. The third apparatus, based on the running conditions of the vehicle 10, determines whether to execute the first brake force distribution control, and determines whether to execute the second brake force distribution control. In other words, the third apparatus, based on the running conditions of the vehicle 10, determines which control should be performed, the first brake force distribution control or the second brake force distribution control. Hereinafter, this point will be mainly described.

(Specific Operation)

Figure 14:
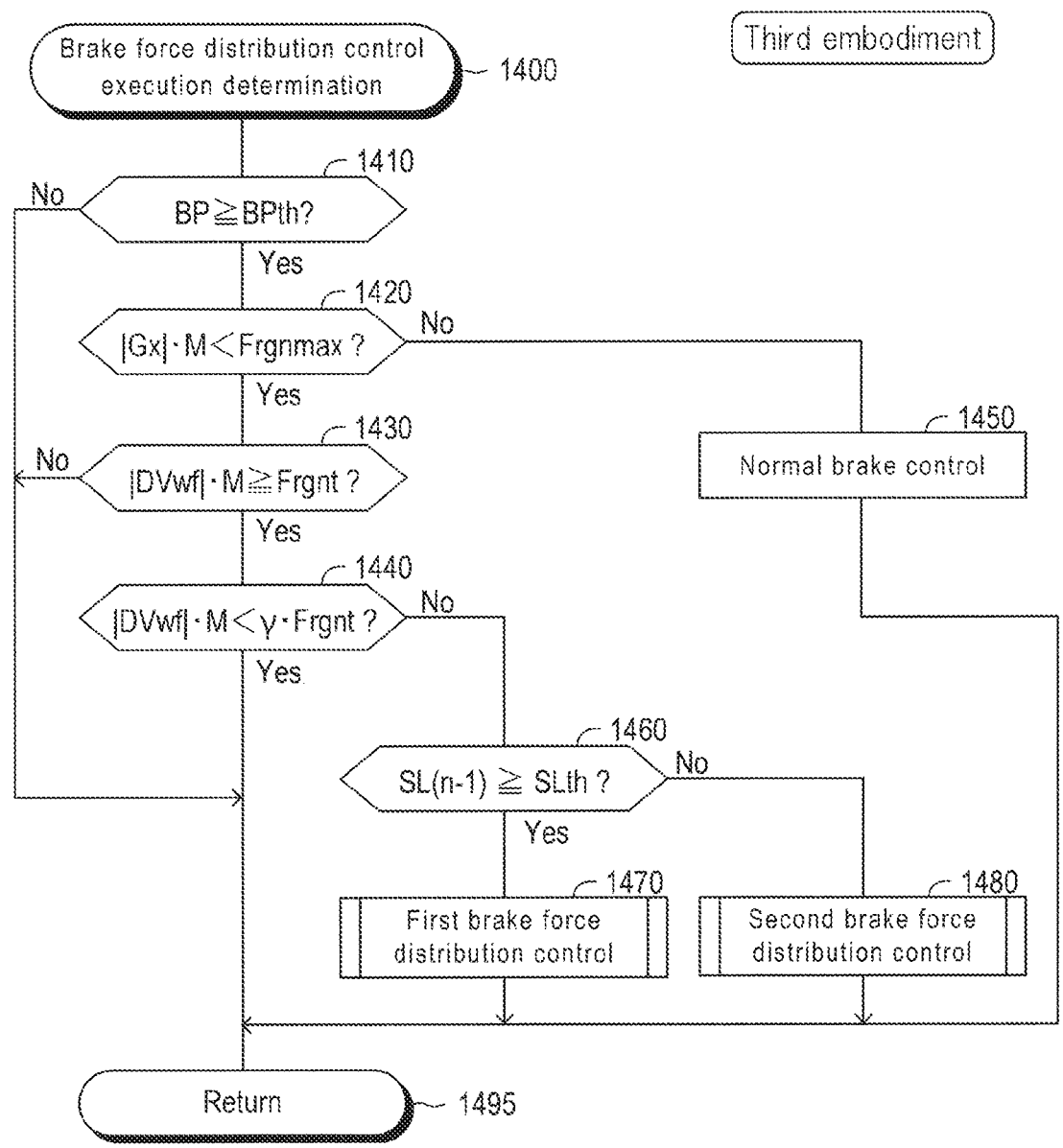
FIG. 14 is a flowchart representing a "brake force distribution control execution determination routine" executed by the CPU of the brake ECU of a third apparatus according to another embodiment of the present disclosure.

The CPU (hereinafter, simply referred to as the "CPU") of the brake ECU 50B of the third apparatus is configured to execute a "brake force distribution control execution determination routine" shown by a flowchart in FIG. 14, every time a constant time (e.g., 20 ms) elapses.

The CPU starts processing of step 1400 at an appropriate timing, and proceeds to step 1410 to determine whether or not the vehicle 10 is being braked. Specifically, the CPU determines whether or not the brake pedal operating amount BP is equal to or larger than a predetermined brake pedal operating amount threshold BPth.

When the brake pedal operating amount BP is smaller than the threshold BPth, the CPU makes a "No" determination at step 1410 and directly proceeds to step 1495 to terminate the present routine tentatively. Namely, in this case, since vehicle 10 is not being braked, the CPU executes neither the first brake force distribution control nor the second brake force distribution control.

In contrast, when the brake pedal operating amount BP is equal to or larger than the threshold BPth, the CPU makes a "Yes" determination at step 1410 and proceeds to step 1420. At step 1420, the CPU determines whether or not a product |Gx|·M is smaller than the maximum regeneration brake force Frgnmax. The "|Gx|" is a magnitude (absolute value) |Gx| of the vehicle acceleration Gx that is obtained/detected by the acceleration sensor 54. The vehicle acceleration Gx represents an acceleration that the driver feels more accurately than the front wheel acceleration DVwf. The "M" is a weight (or a vehicle weight) of the vehicle 10.

When the product |Gx|·M of the magnitude of the vehicle acceleration Gx and the vehicle weight M is determined to be equal to or larger than the maximum regeneration brake force Frgnmax, the CPU makes a "No" determination at step 1420 and proceeds to step 1450 so as to execute a "normal brake control routine". Thereafter, the CPU directly proceeds to step 1495 to terminate the present routine tentatively. The "normal brake control routine" is a routine for executing a "normal brake control" that is a brake control performed when the vehicle 10 is running and being braked on the high μ road at a relatively high deceleration (i.e., a deceleration that is realized by using the friction brake force Ffrc in addition to the regeneration brake force Frgn). When the normal brake control is being performed, the CPU acquires a slip ratio (brake slip ratio) SLi for each of the wheels, based on the wheel speeds (Vwfl, Vwfr, Vwrl, Vwrr) using the following expression, and execute a well known anti-skid control (ABS control) for each of the wheels based on the slip ratio SLi. The CPU executes the ABS control using only the friction brake force Ffrc while setting the regeneration brake force Frgn to zero, as appropriate.

$$SLi=100 \cdot (SPD-Vwi)/SPD (i: fl, fr, rl, \text{ or } rr)$$

In contrast, when the product |Gx|·M of the magnitude of the vehicle acceleration Gx and the vehicle weight M is smaller than the maximum regeneration brake force Frgnmax, the CPU makes a "Yes" determination at step 1420 and proceeds to step 1430. At step 1430, the CPU determines whether or not a product |Dvwf|·M of a magnitude (absolute value) |Dvwf| of the front wheel acceleration DVwf and the vehicle weight M is equal to or larger than the target regeneration brake force Frgnt. When the product |Dvwf|·M is smaller than the target regeneration brake force Frgnt, the CPU makes a "No" determination at step 1430 and directly proceeds to step 1495 to terminate the present routine tentatively. Namely, in this case, since the target regeneration brake force Frgnt is relatively small, and therefore, the front wheels WF is unlikely to slip, the CPU executes neither the first brake force distribution control nor the second brake force distribution control.

To the contrary, when the product |Dvwf|·M of the magnitude of the front wheel acceleration DVwf and the vehicle weight M is equal to or larger than the target regeneration brake force Frgnt, the CPU makes a "Yes" determination at step 1430 and proceeds to step 1440. At step 1440, the CPU determines whether or not the product |Dvwf|·M is smaller than a product γ·Frgnt of a coefficient γ0 and the target regeneration brake force Frgnt. The coefficient γ is a value between 1.1 and 1.2, for instance. Thus, it can be said that, at step 1440, the CPU determines whether or not the product |Dvwf|·M is smaller than a value obtained by adding a third predetermined value ((γ−1)·Frgnt) to the target regeneration brake force Frgnt. In other words, at step 1440, the CPU determines whether or not the product |Dvwf|·M is in the vicinity of the target regeneration brake force Frgnt. When the product |Dvwf|·M is smaller than the product γ·Frgnt, the CPU makes a "Yes" determination at step 1440 and directly proceeds to step 1495 to terminate the present routine tentatively. Namely, in this case, it can be determined that the vehicle 10 is decelerating at a deceleration that is required by the driver, and therefore, the CPU executes neither the first brake force distribution control nor the second brake force distribution control.

In contrast, when the product |Dvwf|·M is equal to or larger than the product γ·Frgnt, the CPU makes a "No" determination at step 1440 and proceeds to step 1460. At step 1460, the CPU determines whether or not a slip ratio SL(n−1) of the front wheels WF is equal to or larger than a predetermined slip ratio threshold SLth. The slip ratio SL(n−1) of the front wheels WF is an average of the brake slip ratio SLfl of the front left wheel WFL calculated at a time point the calculation period of time (the constant time) before the present time point and the brake slip ratio SLfr of the front right wheel WFR calculated at the time point the calculation period of time (the constant time) before the present time point. When the slip ratio SL(n−1) of the front wheels WF is equal to or larger than the predetermined slip ratio threshold SLth, the CPU makes a "Yes" determination at step 1460 and proceeds to step 1470. At step 1470, the CPU execute the first brake force distribution control that the first apparatus executes (refer to FIGS. 3, 5 and 7). Thereafter, the CPU proceeds to step 1495 to terminate the present routine.

To the contrary, when the slip ratio SL(n−1) of the front wheels WF is smaller than the predetermined slip ratio threshold SLth, the CPU makes a "No" determination at step 1460 and proceeds to step 1480. At step 1480, the CPU executes the second brake force distribution control that the second apparatus executes (refer to FIGS. 12 and 14). Thereafter, the CPU proceeds to step 1495 to terminate the present routine.

In this manner, the third apparatus can appropriately determine, based on the running conditions of the vehicle 10, what control should be executed among the normal brake control, the first brake force distribution control, and the second brake force distribution control.

The normal control is a brake control for braking the vehicle 10 running on the high μ road, using both of the regeneration brake force Frgn and the friction brake force Ffrc, wherein the normal/conventional ABS control is executed using the friction brake force Ffrc, as appropriate.

The first brake force distribution control is a brake control executed while the vehicle 10 that is running on the low μ road and is being braked using only the regeneration brake force Frgn.

The second brake force distribution control is a brake control executed while the vehicle 10 that is running on the high μ road and is being slowly braked using only the regeneration brake force Frgn.

Modified Examples

The apparatus according to the present disclosure is not limited to the above embodiments, and various modifications are possible without departing from the scope of the disclosure.

Although the first to third apparatuses described above are applied to an electric vehicle including the motor-generator 21, the battery 22, and the inverter 23, the brake control apparatus according to the present disclosure can be applied to a hybrid vehicle including an internal combustion engine, at least a motor-generator, and a power distribution mechanism, as long as the hybrid vehicle is configured to have the regeneration brake device and the friction brake device.

In the above embodiments, the vehicle speed SPD for calculating the required brake force Freq is an average of the wheel speeds Vwfl, Vwfr, Vwrl, Vwrr of the wheels. However, the vehicle speed SPD may be an average of the wheel speed Vrl of the rear left wheel WRL and the wheel speed Vrr of the rear right wheel WRR. The vehicle speed SPD that is the average value of the wheel speed Vrl and the wheel speed Vrr is not affected by a decrease in the wheel speeds of the front wheels WF even when the one of the front wheels VF slips. Alternatively, the vehicle speed SPD may be an average of the wheel speeds that does not include the lowest wheel speed among the wheel speeds Vwfl, Vwfr, Vwrl, and Vwrr.

In the above embodiments, the value β (the second predetermined value β) by which the target regeneration brake force Frgnt is decreased per one calculation cycle Δt during the brake force replacing control is a constant value (refer to the change rate of the target regeneration brake force Frgnt shown in FIGS. 5 and 13). However, the value β may be variable (may not be necessarily a constant value) as long as the target regeneration brake force Frgnt is gradually decreased and the target wheel friction brake force Ffrct is gradually increased while keeping the sum of the target regeneration brake force Frgnt and the target wheel friction brake force Ffrct unchanged. For instance, the value β may be varied to become larger as the vehicle speed SPD becomes higher, as long as the value β is not too large for the friction brake device 30.

What is claimed is:

1. A brake control apparatus for a vehicle having a regeneration brake device configured to apply a regeneration brake force to front wheels of said vehicle; and a friction brake device configured to apply a front wheel friction brake force to said front wheels and apply a rear wheel friction brake force to rear wheels of said vehicle, comprising:
    wheel speed sensors, each configured to obtain a signal indicative of a wheel speed of each of said front wheels;
    a brake pedal operation amount sensor configured to obtain a signal indicative of an operation amount of a brake pedal; and
    an electronic control unit configured to:
        acquire a front wheel acceleration of said front wheels based on said signal obtained by said wheel speed sensors;
        acquire a required brake force based on said signal obtained by said brake pedal operation amount sensor;
        distribute said required brake force to a target regeneration brake force, a target front wheel friction brake force, and a target rear wheel friction brake force; and
        make said regeneration brake device apply said regeneration brake force that is equal to said target regeneration brake force to said front wheels, make said friction brake device apply said front wheel friction brake force that is equal to said target front wheel friction brake force to said front wheels, and make said friction brake device apply said rear wheel friction brake force that is equal to said target rear wheel friction brake force to said rear wheels,
    wherein,
    in a case where said required brake force is equal to or smaller than a maximum regeneration brake force which said regeneration brake device can apply to said front wheels,
    said electronic control unit is configured to:
        allocate all of said required brake force to said target regeneration brake force; and
        perform brake force decreasing control to decrease said target regeneration brake force by a first predetermined amount without varying said target front wheel friction brake force and said target rear wheel friction brake force, at a first time point at which said front wheel acceleration varies from a value larger than a first acceleration threshold that is a negative value to a value equal to or smaller than said first acceleration threshold while all of said required brake force is being allocated to said target regeneration brake force.

2. The brake control apparatus according to claim 1, wherein,
    while performing said brake force decreasing control,
    said electronic control unit is configured to:
        perform brake force recovery control to increase said target regeneration brake force in such a manner that said target regeneration brake force coincides with said required brake force, if said front wheel acceleration becomes larger than a second acceleration threshold that is equal to or larger than said first acceleration threshold in a period from said first time point to a second time point at which a predetermined time elapses from said first time point; and
        perform brake force replacing control to, if said front wheel acceleration does not become larger than said second acceleration threshold in said period from said first time point to said second time point;

decrease said target regeneration brake force by a second predetermined amount every time a predetermined time elapses; and increase said target front wheel friction brake force and said target rear wheel friction brake force in such a manner that a sum of said target front wheel friction brake force and said target rear wheel friction brake force is increased by said second predetermined amount every time said predetermined time elapses, while maintaining a proportional relationship between said target front wheel friction brake force and said target rear wheel friction brake force.

3. The brake control apparatus according to claim 1, wherein, said electronic control unit is configured to employ, as said first predetermined amount, an amount of 10 to 15 percent of said target regeneration brake force at a time point immediately before said first time point.

4. The brake control apparatus according to claim 2, wherein, said electronic control unit is configured to perform first brake force distribution control including said brake force decreasing control, said brake force recovery control, and said brake force replacing control, wherein said second acceleration threshold is set at a value equal to said first acceleration threshold.

5. The brake control apparatus according to claim 2, wherein, said electronic control unit is configured to perform second brake force distribution control including said brake force decreasing control, said brake force recovery control, and said brake force replacing control, wherein said second acceleration threshold is set at a predetermined positive value.

6. The brake control apparatus according to claim 2, wherein, said electronic control unit is configured to perform:

first brake force distribution control including said brake force decreasing control, said brake force recovery control, and said brake force replacing control, wherein said second acceleration threshold is set at a value equal to said first acceleration threshold, when a product of a magnitude of said front wheel acceleration and a weight of said vehicle is equal to or larger than a value obtained by adding a third predetermined value to said target regeneration brake force at a time point immediately before said first time point, and a slip ratio of said front wheels is equal to or larger than a predetermined slip ratio threshold;

second brake force distribution control including said brake force decreasing control, said brake force recovery control, and said brake force replacing control, wherein said first acceleration threshold of said second brake force distribution control is set at a value equal to or smaller than said first acceleration threshold used in said first brake force distribution control, and said second acceleration threshold of said second brake force distribution control is set at a predetermined positive value, when said product of said magnitude of said front wheel acceleration and said weight is equal to or larger than said value obtained by adding said third predetermined value to said target regeneration brake force at a time point immediately before said first time point, and said slip ratio of said front wheels is smaller than said predetermined slip ratio threshold; and regeneration brake force maintaining control to maintain a state where all of said required brake force is allocated to said target regeneration brake force, when said product of said magnitude of said front wheel acceleration and said weight is smaller than said value obtained by adding said third predetermined value to said target regeneration brake force at a time point immediately before said first time point.

\* \* \* \* \*